US008527615B2

(12) United States Patent  (10) Patent No.: US 8,527,615 B2
Duursma et al.  (45) Date of Patent: *Sep. 3, 2013

(54) APPARATUS AND METHOD FOR DETERMINING A PROGRAM NEIGHBORHOOD FOR A CLIENT NODE IN A CLIENT-SERVER NETWORK

(75) Inventors: Martin Duursma, West Pennant Hills (AU); Anatoliy Panasyuk, Bellevue, WA (US); Robert Ciraldo, Ft. Lauderdale, FL (US); Anthony Ungerman, Fort Lauderdale, FL (US); Bradley Pedersen, Parkland, FL (US); Tom Davis, III, Coral Springs, FL (US); Marc Bloomfield, Pompano Beach, FL (US)

(73) Assignee: Citrix Systems, Inc, Fort Lauderdale, FL (US)

( * ) Notice: Subject to any disclaimer, the term of this patent is extended or adjusted under 35 U.S.C. 154(b) by 1410 days.

This patent is subject to a terminal disclaimer.

(21) Appl. No.: 10/908,202
(22) Filed: May 2, 2005
(65) Prior Publication Data
US 2005/0198292 A1  Sep. 8, 2005

Related U.S. Application Data

(63) Continuation of application No. 09/390,928, filed on Sep. 7, 1999, now Pat. No. 6,928,469, which is a continuation-in-part of application No. 09/252,391, filed on Feb. 18, 1999, now Pat. No. 6,643,690.

(60) Provisional application No. 60/114,099, filed on Dec. 29, 1998.

(51) Int. Cl.
*G06F 15/16* (2006.01)
*G06F 15/173* (2006.01)
(52) U.S. Cl.
USPC .......................... 709/223; 709/201; 709/217
(58) Field of Classification Search
None
See application file for complete search history.

(56) References Cited

U.S. PATENT DOCUMENTS 4,387,425 A  6/1983  El-Gohary
4,499,499 A  2/1985  Brickman et al.
(Continued)

FOREIGN PATENT DOCUMENTS

AU  53031/98  8/1998
DE  19602718  7/1997
(Continued)

OTHER PUBLICATIONS

Novell AppNote—"Accessing Network Resources with the GUI Login Utility and the NetWare Provider," Nov. 1996.
(Continued)

*Primary Examiner* — Azizul Choudhury
(74) *Attorney, Agent, or Firm* — Foley and Lardner LLP; John D. Lanza

(57) ABSTRACT

An apparatus and method for determining a program neighborhood of a client node in a client-server network is described. The program neighborhood of the client node includes application programs hosted by application servers on the network. The present invention enables a user of a client node to learn of these application programs. The user is not required to know where to find such applications or to manually establish links to such applications. To make the client node aware of its program neighborhood, a host server collects application-related information corresponding to application programs hosted by the servers in the network. The application-related information can include the application name, the server location of the application, minimum capabilities required of client nodes for executing the application, and those users who are authorized to use that application. User credentials are received from the client system. The user credentials are used to filter the application-related information. Information representing those application programs that are available to the client node is transmitted from the host server to the client system for display. In a Windows-based client node, the information can be represented by a graphical icon for each available application program.

14 Claims, 11 Drawing Sheets

(56) References Cited

U.S. PATENT DOCUMENTS

| | | |
|---|---|---|
| RE32,632 E | 3/1988 | Atkinson |
| 4,779,189 A | 10/1988 | Legvold et al. |
| 4,860,247 A | 8/1989 | Uchida et al. |
| 4,887,204 A | 12/1989 | Johnson et al. |
| 4,903,218 A | 2/1990 | Longo et al. |
| 4,937,036 A | 6/1990 | Beard et al. |
| 4,937,784 A | 6/1990 | Masai et al. |
| 4,949,248 A | 8/1990 | Caro |
| 4,949,281 A | 8/1990 | Hillenbrand et al. |
| 4,958,303 A | 9/1990 | Assarpour et al. |
| 4,974,173 A | 11/1990 | Stefik et al. |
| 5,014,221 A | 5/1991 | Mogul |
| 5,031,089 A | 7/1991 | Liu et al. |
| 5,062,060 A | 10/1991 | Kolnick et al. |
| 5,072,412 A | 12/1991 | Henderson, Jr. et al. |
| 5,103,303 A | 4/1992 | Shoji et al. |
| 5,119,319 A | 6/1992 | Tanenbaum |
| 5,155,847 A | 10/1992 | Kirouac et al. |
| 5,175,852 A | 12/1992 | Johnson et al. |
| 5,187,790 A | 2/1993 | East et al. |
| 5,202,971 A | 4/1993 | Henson et al. |
| 5,204,897 A | 4/1993 | Wyman |
| 5,204,947 A | 4/1993 | Bernstein et al. |
| 5,231,697 A | 7/1993 | Yamada et al. |
| 5,233,701 A | 8/1993 | Nakata et al. |
| 5,241,625 A | 8/1993 | Epard et al. |
| 5,247,683 A | 9/1993 | Holmes et al. |
| 5,249,290 A | 9/1993 | Heizer |
| 5,255,361 A | 10/1993 | Callaway et al. |
| 5,301,270 A | 4/1994 | Steinberg et al. |
| 5,303,198 A | 4/1994 | Adachi et al. |
| 5,305,440 A | 4/1994 | Morgan et al. |
| 5,309,555 A | 5/1994 | Akins et al. |
| 5,315,711 A | 5/1994 | Barone et al. |
| 5,325,527 A | 6/1994 | Cwikowski et al. |
| 5,329,619 A | 7/1994 | Page et al. |
| 5,341,477 A | 8/1994 | Pitkin et al. |
| 5,341,478 A | 8/1994 | Travis, Jr. et al. |
| 5,351,129 A | 9/1994 | Lai |
| 5,367,688 A | 11/1994 | Croll |
| 5,414,457 A | 5/1995 | Kadowaki et al. |
| 5,440,719 A | 8/1995 | Hanes et al. |
| 5,442,791 A * | 8/1995 | Wrabetz et al. ............ 719/330 |
| 5,457,797 A | 10/1995 | Butterworth et al. |
| 5,459,837 A * | 10/1995 | Caccavale .................... 709/226 |
| 5,461,608 A | 10/1995 | Yoshiyama et al. |
| 5,469,540 A | 11/1995 | Powers, III et al. |
| 5,473,599 A | 12/1995 | Li et al. |
| 5,483,466 A | 1/1996 | Kawahara et al. |
| 5,485,460 A | 1/1996 | Schrier et al. |
| 5,499,343 A | 3/1996 | Pettus |
| 5,515,508 A | 5/1996 | Pettus et al. |
| 5,517,617 A | 5/1996 | Sathaye et al. |
| 5,526,492 A | 6/1996 | Ishida et al. |
| 5,530,852 A | 6/1996 | Meske, Jr. et al. |
| 5,537,546 A | 7/1996 | Sauter et al. |
| 5,537,548 A | 7/1996 | Fin et al. |
| 5,541,927 A | 7/1996 | Kristol et al. |
| 5,548,726 A | 8/1996 | Pettus |
| 5,551,030 A | 8/1996 | Linden et al. |
| 5,553,242 A | 9/1996 | Russell et al. |
| 5,557,732 A | 9/1996 | Thompson |
| 5,557,748 A | 9/1996 | Norris |
| 5,559,958 A | 9/1996 | Farrand et al. |
| 5,561,769 A | 10/1996 | Kumar et al. |
| 5,566,302 A | 10/1996 | Khalidi et al. |
| 5,572,643 A | 11/1996 | Judson |
| 5,572,674 A | 11/1996 | Ernst |
| 5,574,934 A | 11/1996 | Mirashrafi et al. |
| 5,579,469 A | 11/1996 | Pike |
| 5,583,563 A | 12/1996 | Wanderscheid et al. |
| 5,583,992 A | 12/1996 | Kudo et al. |
| 5,586,312 A | 12/1996 | Johnson et al. |
| 5,592,626 A * | 1/1997 | Papadimitriou et al. ...... 718/102 |
| 5,594,490 A | 1/1997 | Dawson et al. |
| 5,596,745 A | 1/1997 | Lai et al. |
| 5,606,493 A | 2/1997 | Duscher et al. |
| 5,619,716 A | 4/1997 | Nonaka et al. |
| 5,623,656 A | 4/1997 | Lyons |
| 5,625,683 A | 4/1997 | Nazanin et al. |
| 5,638,513 A | 6/1997 | Ananda |
| 5,644,720 A | 7/1997 | Boll et al. |
| 5,655,081 A | 8/1997 | Bonnell et al. |
| 5,655,218 A | 8/1997 | Smolinske |
| 5,657,390 A | 8/1997 | Elgamal et al. |
| 5,666,501 A | 9/1997 | Jones et al. |
| 5,671,354 A | 9/1997 | Ito et al. |
| 5,671,379 A | 9/1997 | Kuse et al. |
| 5,680,549 A | 10/1997 | Raynak et al. |
| 5,684,861 A | 11/1997 | Lewis et al. |
| 5,689,708 A | 11/1997 | Regnier et al. |
| 5,692,183 A | 11/1997 | Hapner et al. |
| 5,701,451 A | 12/1997 | Rogers et al. |
| 5,701,484 A | 12/1997 | Artsy |
| 5,706,437 A | 1/1998 | Kirchner et al. |
| 5,708,786 A | 1/1998 | Teruuchi et al. |
| 5,710,918 A | 1/1998 | Lagarde et al. |
| 5,721,876 A | 2/1998 | Yu et al. |
| 5,729,734 A | 3/1998 | Parker et al. |
| 5,734,865 A | 3/1998 | Yu |
| 5,737,592 A | 4/1998 | Nguyen et al. |
| 5,742,778 A | 4/1998 | Hao et al. |
| 5,748,892 A | 5/1998 | Richardson |
| 5,748,896 A | 5/1998 | Daly et al. |
| 5,754,830 A | 5/1998 | Butts et al. |
| 5,757,925 A | 5/1998 | Faybishenko |
| 5,758,085 A | 5/1998 | Kouoheris et al. |
| 5,761,507 A | 6/1998 | Govett |
| 5,761,662 A | 6/1998 | Dasan |
| 5,764,908 A | 6/1998 | Shoji et al. |
| 5,764,915 A | 6/1998 | Heimsoth et al. |
| 5,767,849 A | 6/1998 | Borgendale et al. |
| 5,768,614 A | 6/1998 | Takagi et al. |
| 5,774,668 A * | 6/1998 | Choquier et al. ............ 709/223 |
| 5,790,977 A | 8/1998 | Ezekiel |
| 5,794,207 A | 8/1998 | Walker et al. |
| 5,802,258 A | 9/1998 | Chen |
| 5,802,306 A | 9/1998 | Hunt |
| 5,805,166 A * | 9/1998 | Hall et al. .................... 715/839 |
| 5,812,784 A | 9/1998 | Watson et al. |
| 5,819,093 A | 10/1998 | Davidson et al. |
| 5,826,027 A | 10/1998 | Pedersen et al. |
| 5,828,840 A | 10/1998 | Cowan et al. |
| 5,838,906 A | 11/1998 | Doyle et al. |
| 5,838,910 A | 11/1998 | Domenikos et al. |
| 5,838,916 A * | 11/1998 | Domenikos et al. .......... 709/219 |
| 5,842,195 A | 11/1998 | Peters et al. |
| 5,842,206 A | 11/1998 | Sotomayor |
| 5,844,553 A | 12/1998 | Hao et al. |
| 5,848,242 A | 12/1998 | Behaghel et al. |
| 5,848,410 A | 12/1998 | Walls et al. |
| 5,860,068 A | 1/1999 | Cook |
| 5,862,348 A * | 1/1999 | Pedersen ....................... 709/229 |
| 5,864,678 A | 1/1999 | Riddle |
| 5,870,545 A | 2/1999 | Davis et al. |
| 5,870,552 A | 2/1999 | Dozier et al. |
| 5,874,960 A | 2/1999 | Mairs et al. |
| 5,877,757 A | 3/1999 | Baldwin et al. |
| 5,881,241 A | 3/1999 | Corbin |
| 5,884,046 A | 3/1999 | Antonov |
| 5,889,942 A | 3/1999 | Orenshteyn |
| 5,898,835 A | 4/1999 | Truong |
| 5,905,866 A * | 5/1999 | Nakabayashi et al. ........ 709/223 |
| 5,913,060 A | 6/1999 | Discavage |
| 5,913,920 A | 6/1999 | Adams et al. |
| 5,923,842 A | 7/1999 | Pedersen et al. |
| 5,928,324 A | 7/1999 | Sloan et al. |
| 5,930,473 A * | 7/1999 | Teng et al. .................... 709/204 |
| 5,930,804 A | 7/1999 | Yu et al. |
| 5,938,733 A | 8/1999 | Heimsoth et al. |
| 5,940,075 A | 8/1999 | Mutschler, III et al. |
| 5,941,949 A | 8/1999 | Pedersen |
| 5,941,988 A | 8/1999 | Bhagwat et al. |
| 5,944,791 A | 8/1999 | Scherpbier |

| | | |
|---|---|---|
| 5,949,975 A | 9/1999 | Batty et al. |
| 5,951,694 A | 9/1999 | Choquier et al. |
| 5,960,409 A | 9/1999 | Wexler |
| 5,961,586 A | 10/1999 | Pedersen |
| 5,961,588 A | 10/1999 | Cooper et al. |
| 5,968,132 A | 10/1999 | Tokunaga et al. |
| 5,973,696 A | 10/1999 | Agranat et al. |
| 5,978,847 A | 11/1999 | Kisor et al. |
| 5,978,848 A | 11/1999 | Maddalozzo, Jr. et al. |
| 5,983,190 A | 11/1999 | Trower, II et al. |
| 5,987,499 A * | 11/1999 | Morris et al. ............ 709/203 |
| 5,999,179 A | 12/1999 | Kekic et al. |
| 5,999,950 A | 12/1999 | Krueger et al. |
| 6,009,410 A | 12/1999 | LeMole et al. |
| 6,014,133 A | 1/2000 | Yamakado et al. |
| 6,023,507 A | 2/2000 | Wookey |
| 6,023,572 A * | 2/2000 | Lautzenheiser et al. ...... 703/2 |
| 6,023,721 A | 2/2000 | Cummings |
| 6,031,533 A * | 2/2000 | Peddada et al. ............ 715/733 |
| 6,034,689 A | 3/2000 | White et al. |
| 6,035,337 A * | 3/2000 | Redpath et al. ............ 709/234 |
| 6,038,596 A | 3/2000 | Baldwin et al. |
| 6,038,599 A * | 3/2000 | Black et al. ............... 709/223 |
| 6,061,695 A * | 5/2000 | Slivka et al. ............... 715/203 |
| 6,065,059 A | 5/2000 | Shieh et al. |
| 6,067,568 A | 5/2000 | Li et al. |
| 6,067,580 A | 5/2000 | Aman et al. |
| 6,078,956 A | 6/2000 | Bryant et al. |
| 6,088,515 A * | 7/2000 | Muir et al. ............... 709/217 |
| 6,101,528 A * | 8/2000 | Butt ............................ 709/203 |
| 6,101,531 A | 8/2000 | Eggleston et al. |
| 6,104,392 A * | 8/2000 | Shaw et al. ............... 715/749 |
| 6,108,712 A | 8/2000 | Hayes, Jr. |
| 6,115,744 A * | 9/2000 | Robins et al. ............. 709/227 |
| 6,125,387 A | 9/2000 | Simonoff et al. |
| 6,131,116 A | 10/2000 | Riggins et al. |
| 6,141,759 A | 10/2000 | Braddy |
| 6,154,749 A * | 11/2000 | Aravamudan et al. ............ 1/1 |
| 6,157,705 A * | 12/2000 | Perrone .................. 379/88.01 |
| 6,157,944 A | 12/2000 | Pedersen |
| 6,157,953 A | 12/2000 | Chang et al. |
| 6,161,126 A | 12/2000 | Wies et al. |
| 6,161,145 A | 12/2000 | Bainbridge et al. |
| 6,167,432 A | 12/2000 | Jiang |
| 6,175,854 B1 | 1/2001 | Bretscher |
| 6,185,609 B1 | 2/2001 | Rangarajan et al. |
| 6,195,678 B1 | 2/2001 | Komuro et al. |
| 6,199,753 B1 | 3/2001 | Tracy et al. |
| 6,256,666 B1 | 7/2001 | Singhal |
| 6,263,363 B1 | 7/2001 | Rosenblatt et al. |
| 6,263,377 B1 | 7/2001 | Monday et al. |
| 6,266,781 B1 | 7/2001 | Chung et al. |
| 6,272,493 B1 | 8/2001 | Pasquali |
| 6,272,556 B1 | 8/2001 | Gish |
| 6,289,461 B1 | 9/2001 | Dixon |
| 6,292,827 B1 | 9/2001 | Raz |
| 6,311,205 B1 | 10/2001 | Dutcher et al. |
| 6,332,157 B1 | 12/2001 | Mighdoll et al. |
| 6,336,138 B1 * | 1/2002 | Caswell et al. ............ 709/223 |
| 6,338,086 B1 | 1/2002 | Curtis et al. |
| 6,339,826 B2 | 1/2002 | Hayes, Jr. et al. |
| 6,374,237 B1 | 4/2002 | Reese |
| 6,393,015 B1 * | 5/2002 | Shtivelman ............... 370/352 |
| 6,393,469 B1 * | 5/2002 | Dozier et al. ............. 709/219 |
| 6,409,602 B1 | 6/2002 | Wiltshire et al. |
| 6,446,109 B2 | 9/2002 | Gupta |
| 6,473,781 B1 * | 10/2002 | Skagerwall et al. ........ 709/201 |
| 6,510,466 B1 * | 1/2003 | Cox et al. ................. 709/229 |
| 6,567,852 B2 | 5/2003 | Besaw et al. |
| 6,654,784 B1 | 11/2003 | Wei |
| 6,738,809 B1 * | 5/2004 | Brisebois et al. ............ 709/224 |
| 6,792,605 B1 | 9/2004 | Roberts et al. |
| 6,912,582 B2 | 6/2005 | Guo et al. |
| 6,950,991 B2 | 9/2005 | Bloomfield et al. |
| 6,986,040 B1 | 1/2006 | Kramer et al. |
| 7,000,019 B2 | 2/2006 | Low et al. |
| 7,028,025 B2 | 4/2006 | Collins et al. |
| 7,237,114 B1 | 6/2007 | Rosenberg |
| 7,266,582 B2 | 9/2007 | Stelting |
| 7,296,022 B2 | 11/2007 | Harjanto |
| 7,340,772 B2 | 3/2008 | Panasyuk et al. |
| 2001/0007995 A1 | 7/2001 | Makino |
| 2001/0052932 A1 | 12/2001 | Young et al. |
| 2001/0056547 A1 | 12/2001 | Dixon |
| 2002/0035451 A1 | 3/2002 | Rothermel |
| 2003/0014326 A1 | 1/2003 | Ben-Meir et al. |
| 2003/0063119 A1 | 4/2003 | Bloomfield et al. |
| 2004/0139117 A1 | 7/2004 | Muir et al. |
| 2005/0198380 A1 | 9/2005 | Panasyuk et al. |

FOREIGN PATENT DOCUMENTS

| | | |
|---|---|---|
| EP | 0381645 | 8/1990 |
| EP | 0384339 | 8/1990 |
| EP | 0414624 | 2/1991 |
| EP | 0475581 | 3/1992 |
| EP | 0483576 | 5/1992 |
| EP | 0540151 | 5/1993 |
| EP | 0643514 | 3/1995 |
| EP | 0648038 | 4/1995 |
| EP | 0732834 | 9/1996 |
| EP | 0767563 | 4/1997 |
| EP | 0818753 | 1/1998 |
| EP | 0841615 | 5/1998 |
| EP | 0878759 | 11/1998 |
| EP | 1321853 | 6/2003 |
| GB | 2323946 | 10/1998 |
| JP | 06125363 | 5/1994 |
| JP | 06332782 | 12/1994 |
| WO | WO-93/15457 | 8/1993 |
| WO | WO-94/14114 | 6/1994 |
| WO | WO-97/18635 | 5/1997 |
| WO | WO-97/28623 | 8/1997 |
| WO | WO-98/52320 | 11/1998 |
| WO | WO-98/52344 | 11/1998 |
| WO | WO-99/22332 | 5/1999 |
| WO | WO-01/55813 | 8/2001 |
| WO | WO-02/093289 | 11/2002 |

OTHER PUBLICATIONS

Novell AppNote—"Using the Novell Application launcher (NAL) Utility with Client 32 for Windows 95," Nov. 1996.
Network Neighborhood—Webopedia Definition and Links http://webopedia.internet.com/TERM/N/Network_Neighborhood.html, printed Dec. 27, 1999 (2 pages).
Win95 Tutorial: index of topics, http://orion.valencia.cc.fl.us/tutorials/Win95demo/net.html, printed Dec. 27, 1999 (2 pages).
Allison, Bridget et al., File System Security: Secure Network Data Sharing for NT and UNIX, http://www.netapp.com/tech_library/1003.html, printed May 22, 2000, published 1998, 16 pages.
Yager; Tom, "OS Paradise", BYTE, Nov. 1995, pp. 81-98.
Neuman, B. Clifford et al., "Proxy-Based Authorization and Accounting for Distributed Systems", Proceedings of the International Conference on Distributed Computing Systems, Los Alamitos, IEEE Comp. Soc. Press, May 25, 1993, pp. 283-291.
Non Final Office Action, U.S. Appl. No. 09/390,928 USPTO, dated May 1, 2002.
Final Office Action, U.S. Appl. No. 09/390,928 USPTO, dated Nov. 15, 2002.
Non Final Office Action, U.S. Appl. No. 09/390,928 USPTO, dated Jun. 25, 2003.
Final Office Action, U.S. Appl. No. 09/390,928 USPTO, dated Mar. 19, 2004.
International Search Report, PCT/US99/30827, 1999.
About Windows NT Networking, Chapter 5, Part 1, "Windows NT Browser," pp. 79-87 (1995).
P. Liu, Y. Kiyoki and T. Masuda, "Efficient Algorithms for Resource allocation in distributed and parallel query processing environments," pp. 1-5 (1989).
A.S. Tanenbaum, Computer Networks, 2nd Ed. Prentice Hall, Englewood Cliffs, NJ, (1989).
D. Oliver, Netscape 2 Unleashed, Sams.net Publishing, pp. 261-263 (1996).
Allocation of Equivalent Communication Buffer Sizes in SQLJRA Remote Protocol, IBM technical Disclosure Bulletin, vol. 36, No. 1, pp. 29-31 (Jan. 1993).

Abe et al.; Distributed Cooperative Control for Sharing Applications Based on the MERMAID Multiparty and Multimedia Desktop Conferencing System; NEC Research and Development; Jan. 1993; pp. 121-131.

Adler, "Distributed Coordination Models for Client/Server Computing," Computer Magazine, pp. 14-22, (Apr. 1995).

Allocation of Equivalent Communication Buffer Sizes in SQLJRA Remote Protocol; IBM Technical Disclosure Bulletin, vol. 36, No. 1, Jan. 1993; pp. 29-31.

Campbell et al., "Meeting End-to-End QoS Cahllenges for Scalable Flows in Heterogeneous Multimedia Environments," Nov. 9, 1995; pp. 101-115.

Chu et al., Behavior Research Methods, Instruments and Computers; "Creating a Hypertext Markup language Documents for an Information Server," vol. 27, No. 2, pp. 200-205, Jan. 1, 1995.

Davis; Database; "An Interactive Hypermedia Map Viewer," vol. 18, No. 2, pp. 65-67 (Apr./May 1995).

Coulouris et al. "Distributed Systems Concepts and Design," Second Edition, University of London, Addison-Wesley, 1994.

Droms, Dynamic Host Confifuration Protocol, Network Working Group Request for Comments: 1541, pp. 1-39 (Oct. 1993).

Hoff Van, "Java and Internet Programming," Dr. Dobb's Journal, pp. 56, 58, 60-61, 101-102, (Aug. 1995).

Holtzman, "Merge 386: Run Unix and DOS together on an 80386," Byte, pp. cover, 207-208, 211-212 (Dec. 1988).

IP Multicast Streamlines Delivery of Multicast Applications; Copyright 1995, Cisco Systems Inc. pp. 1-5.

Herb, "The Animator Applet (1.0.2)—example 1," http://199.185.96.71/java/Animator/example1.html, Printed Jun. 1, 1999.

Mann et al. "Terminal Servers on Ethernet Local Area Networks," Digital Technical Journal, No. 3, pp. 73-87, (Sep. 1986).

Multicast Routing; Copyright 1996, Cisco Systems Inc. pp. 1-4.

OS/2 EE Database Manager SQLJRA Remote Protocol, IBM Technical Disclosure Bulletin, vol. 36, No. 1, pp. 33-36, (Jan. 1993).

Putz, "Interactive Information Services using World-Wide Web Hypertext," Comuter Networks and ISDN Systems, Elsevier Science B.V., vol. 27, pp. 273-280, 1994.

Schemers, "Ibnamed: A Load Balancing Name Server Written in Perl—Update," http://www.leland.stanford.edu/~docs/ibnamed/ibnamed.html, pp. 1-5, (Sep. 17, 1995).

Shashi Prasad; "Weaving a Thread," Byte, Oct. 1995; pp. 173-174.

Singleton, A.; Byte; "Wired on the Web," pp. 77-78, 80 (Jan. 1, 1996).

Tessier, Dr. Dobb's Journal; using Javascript to Create Interactive Web pages a Cross-Platform Object Scripting Language, 21, No. 3: 84-97 (Mar. 1, 1996).

"Remote Desktop Environments Reflected in Local Desktop Windows," IBM Technical Disclosure Bulletin, 36(3): 421-426 (Mar. 1993).

Non Final office Action, USPTO U.S. Appl. No. 10/068,461, dated Oct. 21, 2004.

Venu Vasudevan, "A Web Services Primer," retrieved from the internet : http://www.xml.com/lpt/a/ws/2001/04/04/webservices/index.html, (Jan. 21, 2005), 10 pages, O'Reilly Media Inc.

Satya Komatineni, "Understanding UDDI and JAXR," retrieved from the internet: http://www.onjava.com/lpt/a/1570, (Jan. 19, 2005), 11 pages, O'Reilly Media, Inc.

Patents Act 1977 Examination Report under Section 18(3) Re: Application No. GB0422889.6 (Jan. 31, 2005), 3 pages, Issued by United kingdom, The Patent Office.

International Search Report, PCT/US03/08434, dated Aug. 14, 2003.

Windows NT Networking Guide: Microsoft Windows NT Resource Kit, pp. 79-87, Microsoft Press 1995.

Eckhart Koppen et al., "A Practical Approach Towards Active Hyperlinked Documents," Computer Networks and ISDN Systems 30 (1998) pp. 251-258.

Michael Jem, "'Thin' vs. 'Fat' Visualization Client," 1998 IIEE, pp. 772-788.

Freeman H., A Scheme for the Efficient Encoding of Graphical Data for Communication and Information Processing, Proceedings of the Electronics Congress—Advances in Electronics, Rassegna, IT, pp. 340-348, Mar. 24, 1969.

Freeman H., "Computer Processing of Line -Drawing Images," ACM Computing Surveys, New York, NY, vol. 6, No. 1, pp. 57-97, Mar. 1974.

Final Office Action, USPTO U.S. Appl. No. 10/104,863. Dated Apr. 7, 2008.

Non Final Office Action, USPTO U.S. Appl. No. 10/104,863. Dated Oct. 25, 2007.

Final Office Action, USPTO U.S. Appl. No. 10/104,863. Dated Jul. 6, 2007.

Non Final Office Action, USPTO U.S Appl. No. 10/104,863. Dated Dec. 29, 2006.

Non Final Office Action, USPTO U.S. Appl. No. 10/104,863. Dated Jul. 17, 2006.

Final Office Action, USPTO U.S. Appl. No. 10/104,863. Dated Mar. 22, 2006.

Non Final Office Action, USPTO U.S. Appl. No. 10/104,863. Dated Oct. 7, 2005.

Non Final Office Action, USPTO U.S. Appl. No. 10/068,461. Dated Oct. 21, 2004.

Non Final Office Action, USPTO U.S. Appl. No. 10/288,821. Dated May 28, 2008.

Non Final Office Action, USPTO U.S. Appl. No. 10/288,821. Dated Feb. 20, 2008.

Final Office Action, USPTO U.S. Appl. No. 10/288,821. Dated Jun. 17, 2005.

Non Final Office Action, USPTO U.S. Appl. No. 10/288,821. Dated Oct. 21, 2004.

* cited by examiner

APPARATUS AND METHOD FOR DETERMINING A PROGRAM NEIGHBORHOOD FOR A CLIENT NODE IN A CLIENT-SERVER NETWORK

CROSS REFERENCE TO RELATED APPLICATIONS

This application is a continuation of U.S. application Ser. No. 09/390,928 filed on Sep. 7, 1999, which is a Continuation-in-part of application Ser. No. 09/252,391 filed on Feb. 18, 1999, now U.S. Pat. No. 6,643,690, which is a nonprovisional of U.S. Provisional Patent Application No. 60/114,099 filed on Dec. 29, 1998.

BACKGROUND OF THE INVENTION

Contemporary computer networks consist of a number of computer systems, called nodes, communicating with other computer systems via communication links. Typically, some of the nodes are client nodes and other nodes are server nodes. A client node formulates and delivers queries to a server node. A user of the client node enters the queries through a user interface operating on the client node. The server node evaluates the queries and delivers responses to the client node for display on the client user interface.

Usually, the server nodes host a variety of application programs that can be accessed and executed by client nodes. When a client node launches an application program, the execution of that application program can occur at either the client node or the server node, depending upon the computing model followed by the computer network. In a server-based computing model, the server node executes the application program, and only the control information for the client user interface is transmitted across the computer network to the client node for display. In a client-based computing model, the server node transmits the application program to the client node so that the client node can run the program using the resources of the client node.

One drawback of contemporary computer networks is that client nodes may be unaware of the application programs available for use on the server nodes. In fact, client nodes may not even be aware of each available server node on the network. To find available application programs on a particular server node, a user of the client node may need to find and gain access to that server node and perform a directory listing of the files on that server node. Even then, this listing might not indicate to the user those applications which the user is authorized to use.

Moreover, once the user is aware of the application programs on a server node, often that user must establish a link to those applications. Industry has developed software tools to aid the user in creating these links, e.g., Remote Application Manager manufactured by Citrix Systems, Inc., of Ft. Lauderdale, Fla. The Remote Application Manager is an application program installed on the client node. This application program guides an administrator of the client node to enter information that establishes a link to an application published on a particular server node. The administrator supplies such information as the name of the session, the protocol for accessing the server node, the server name or IP address or the published application. Approaches of this kind require that the administrator know the information and understand the details of protocols and domains in order to establish the connection.

BRIEF SUMMARY OF THE INVENTION

The present invention enables the user of a client system to become informed about available application programs on servers in a network without requiring the user to know where to find such applications or to enter technical information necessary to link to such applications.

In one aspect, the invention relates to a method for presenting application programs to a client system in a network including the client system and a plurality of servers. The servers include a host server that receives application-related information corresponding to application programs hosted by a plurality of servers in a network. User credentials are received from the client system. Whether each hosted application program is available to the client system for execution is determined based on the user credentials and the received application-related information. Information is transmitted from the host server to the client system indicating to the client system each hosted application that is available to the client system for execution. In some embodiments, the host server creates an output display containing the application-related information, such as a HyperText Markup Language (HTML) file, an Extended Markup Language (XML), or other Structured General Markup Language (SGML) file.

The host server can authenticate the client system based on received user credentials. When the client system selects one of the available applications for execution, that application can be executed without requiring additional input of user credentials by a user of the client system, although the selected application is at a server other than the host server.

In one embodiment, a connection is established between the client system and the host server using an Independent Computing Architecture (ICA) protocol. The ICA protocol can establish a virtual channel to transmit information to the client system indicating each hosted application program that is available to the client system.

A request to execute one of the available hosted application programs can be received on the connection. In response to the request, a second connection between the client system and the host server can be established to exchange information associated with an execution of the requested application program. In another embodiment, a connection between the host server and a second server hosting the requested application can be established in response to the request. Information associated with an execution of the requested application program can be exchanged between the second server and the client system via the host server.

A second request to execute a second one of the available hosted application programs can be received on the connection between the host server and the client system. Another connection between the host server and a third server hosting the requested application can be established in response to the second request. Information associated with an execution of the second requested application program can be exchanged between the third server and the client system via the host server. Information received from the second and third servers can be merged for transmission to the client system.

In still another embodiment, application information can be provided by the host server to the client system in response to the first request. A second connection can be established between the client system and a second server hosting the requested application in response to the provided application information.

The host server can transmit the available application information in response to a request by the client system. The transmitted information can produce a graphical user interface display at the client system having icons representing the available application programs. The transmitted information can also disclose each hosted application program that the client system is unauthorized to use.

The host server can communicate with each of the other servers to determine the application programs hosted by those other servers and to develop a database for storing the application-related information. The database can be accessible to each of the other servers of the plurality, or each of the other servers can maintain a database for storing the application-related information.

In another aspect, the invention relates to a method for presenting to a client system each application hosted by a server that is available to the client system. User credentials are received from the client system. Application-related information is maintained by the server. Whether each application hosted by the server is available to the client system for execution is determined based on the user credentials and the application-related information. Information indicating each application that is available to the client system is transmitted from the server to the client system.

In another aspect, the invention relates to a server comprising a service module that collects application-related information corresponding to application programs hosted by the plurality of servers. A database stores the collected application-related information. A receiver receives user credentials from the client system. The service module determines for each application program hosted by the plurality of servers whether that hosted application program is available for use by the user of the client system based on the user credentials and the application-related information stored in the database. A transmitter transmits information to the client system.

The service module can transmit a datagram to other servers in the plurality to collect the application-related information corresponding to the application programs hosted by those servers. The transmitted information discloses to a user of the client system each hosted application program that is available for use by the user of the client system. The transmitter can transmit available application information using a virtual channel communications protocol.

BRIEF DESCRIPTION OF THE DRAWINGS

The invention is pointed out with particularity in the appended claims. The above and further advantages of the invention may be better understood by referring to the following description in conjunction with the accompanying drawings, in which:

DETAILED DESCRIPTION OF THE INVENTION

Figure 1:
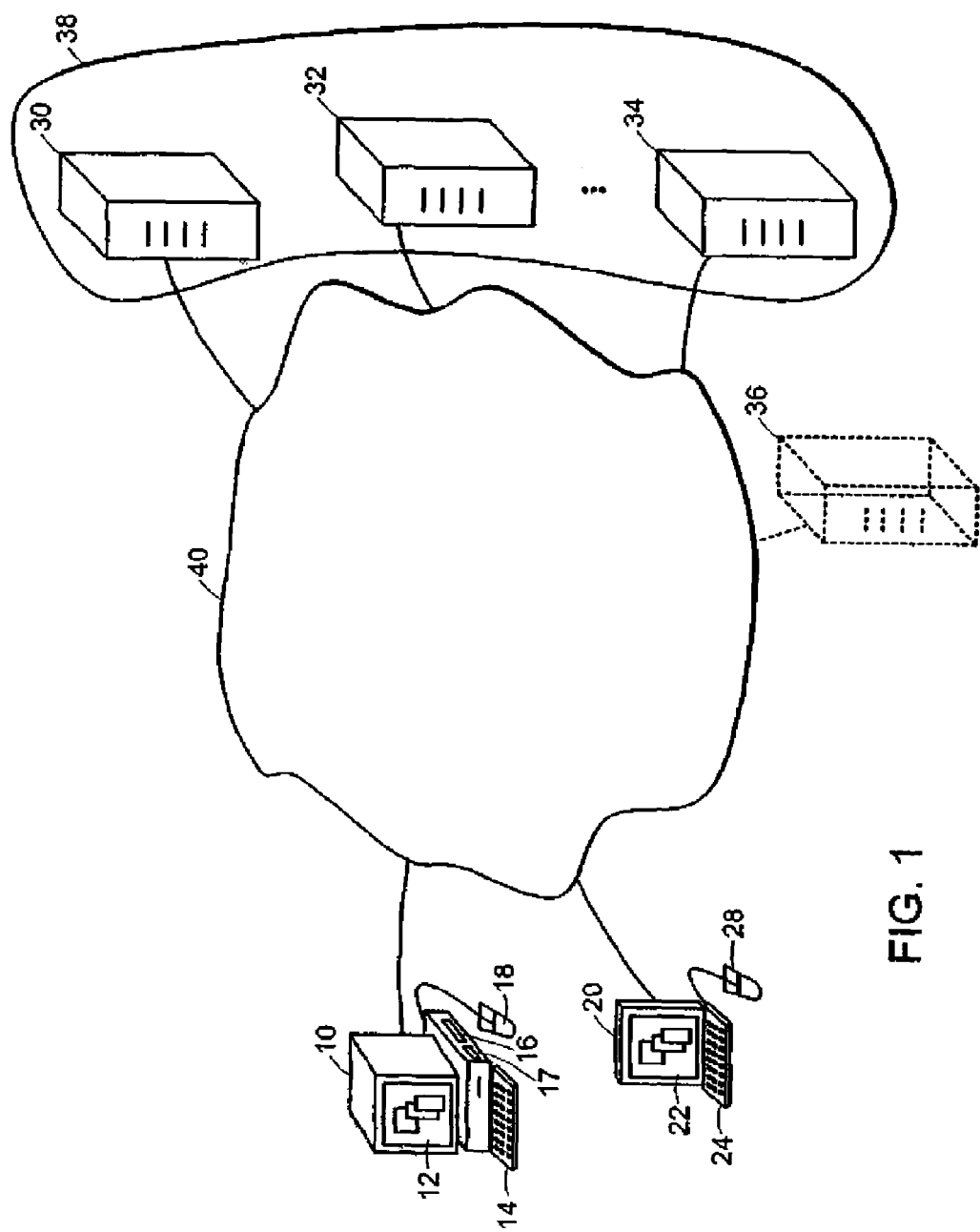
FIG. 1 is a diagram of an embodiment of client nodes in communication with a group of server nodes via a network, wherein a program neighborhood of a client node can be determined according to the principles of the invention.

FIG. 1 shows a first computing system (client node) 10 and a second computing system (client node) 20 in communication with computing systems (application servers) 30, 32, 34, and 36 over a network 40. The network 40 can be a local-area network (LAN) or a wide area network (WAN) such as the Internet or the World Wide Web. Users of the client nodes 10, 20 can be connected to the network 40 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, Ethernet, RS232, and direct asynchronous connections).

The client node 10 can be any personal computer (e.g., 286, 386, 486, PENTIUM, PENTIUM II, MACINTOSH computer), Windows-based terminal, Network Computer, wireless device, information appliance, RISC Power PC, X-device, workstation, mini computer, main frame computer or other computing device that has a windows-based desktop and sufficient persistent storage for executing application programs downloaded from the application servers 30, 32, 34 across the network 40. Windows-oriented platforms supported by the client node 10 can include WINDOWS 3.x, WINDOWS 95, WINDOWS 98, WINDOWS NT 3.51, WINDOWS NT 4.0, WINDOWS CE, MACINTOSH, JAVA, and UNIX. The client node 10 can include a display screen 12, a keyboard 14, memory 16 for storing downloaded application programs, a processor 17, and a mouse 18. The memory 16 can provide persistent or volatile storage. The processor 17 can execute the application programs locally on the client node 10 and display a resulting windows-based desktop on the display screen 12. Such local processing on the client node 10 is according to the above-described client-based computing model.

Alternatively, the client node 20 can be any terminal (windows or non-windows based), or thin-client device operating according to a server-based computing model. In a server-based computing model, the execution of application programs occurs entirely on the application servers 30, 32, 34, and the user interface, keystrokes, and mouse movements are transmitted over the network 40 to the client node 20. The user interface can be text driven (e.g., DOS) or graphically driven (e.g., Windows). Platforms that can be supported by the client node 20 include DOS and Windows CE for windows-based terminals. The client node 20 includes a display screen 22, a keyboard 24, a mouse 28, a processor (not shown), and persistent storage (not shown).

The application servers 30, 32, 34, and 36 can be any computing device that controls access to other portions of the network (e.g., workstations, printers). It is to be understood that more or fewer application servers can be connected to the network 40. The servers 30, 32, 34, and 36 can operate according to either a client-based computing model or a server-based computing model as described above.

Each application server 30, 32, 34, and 36 hosts one or more application programs that can be accessed by the client nodes 10 and 20. Applications made available to client nodes for use are referred to as published applications. Examples of such applications include word processing programs such as MICROSOFT WORD® and spreadsheet programs such as MICROSOFT EXCEL®, both manufactured by Microsoft Corporation of Redmond, Wash., financial reporting programs, customer registration programs, programs providing technical support information, customer database applications, or application set managers.

The servers 30, 32, and 34 can belong to the same domain 38. In the network 40, a domain is a sub-network comprising a group of application servers and client nodes under control of one security database. A domain can include one or more "server farms." (A server farm is a group of servers that are linked together to act as a single server system to provide centralized administration.) Conversely, a server farm can include one or more domains. For servers of two different domains to belong to the same server farm, a trust relationship may need to exist between the domains. A trust relationship is an association between the different domains that allows a user to access the resources associated with each domain with just one log-on authentication.

In one embodiment, the application server 36 is in a different domain than the domain 38. In another embodiment, the application server 36 is in the same domain as servers 30, 32, and 34. For either embodiment, application servers 30, 32, and 34 can belong to one server farm, while the server 36 belongs to another server farm, or all of the application servers 30, 32, 34, and 36 can belong to the same server farm. When a new server is connected to the network 40, the new server joins either an existing server farm or starts a new server farm.

The network 40 can include a master server node for performing load-level balancing among the application servers 30, 32, 34, and 36. The master server node can be one of the application servers 30, 32, 34, or 36. The master server node includes a list of server addresses and load information corresponding to each of the other application servers. The master server node can direct the client node to a particular server node on which to execute an application based on the list of available servers and corresponding load levels. Alternatively, the application servers 30, 32, 34, 36 may collaborate among themselves in a peer-to-peer fashion in order to exchange administration information such as load levels, allowing any server 30, 32, 34, 36 to respond to a request made by a client node 10, 20.

Program Neighborhood

According to the principles of the invention, a user of either client node 10, 20 is able to learn of the availability of application programs hosted by the application servers 30, 32, 34, and 36 in the network 40 without requiring the user to know where to find such applications or to enter technical information necessary to link to such applications. These available application programs comprise the "program neighborhood" of the user. A system for determining a program neighborhood for a client node includes an application program (hereafter referred to as the "Program Neighborhood" application), memory for storing components of the application program, and a processor for executing the application program.

The Program Neighborhood application can be installed in memory of the client node 10 and/or on the application servers 30, 32, 34, and 36 as described below. The Program Neighborhood application is a collection of services, applications program interfaces (APIs), and user interface (UI) programs that disclose to users of the client nodes 10, 20 those application programs hosted by the application servers that each client node is authorized to use (e.g., execute).

An application server operating according to the Program Neighborhood application collects application-related information from each of the application servers in a server farm. The application-related information for each hosted application can be a variety of information including, for example, an address of the server hosting that application, the application name, the users or groups of users who are authorized to use that application, and the minimum capabilities required of the client node before establishing a connection to run the application. For example, the application may stream video data, and therefore a required minimum capability is that the client node supports video data. Other examples are that the client node can support audio data or can process encrypted data. The application-related information can be stored in a database as described later in the specification.

When a client node logs onto the network 40, the user of the client node provides user credentials. User credentials typically include the username of the client node, the password of the user, and the domain name for which the user is authorized. The user credentials can be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client node can be obtained and submitted for authentication. The server responding to the client node can authenticate the user based on the user credentials. The user credentials can be stored wherever the Program Neighborhood application is executing. When the client node 10 executes Program Neighborhood application, the user credentials can be stored at the client node 10. When an application server is executing the Program Neighborhood, the user credentials can be stored at that server.

From the user credentials and the application-related information, the server can also determine which application programs hosted by the application servers are available for use by the user of the client node. The server transmits information representing the available application programs to the client node. This process eliminates the need for a user of the client node to set-up application connections. Also, an administrator of the server can control access to applications among the various client node users.

The user authentication performed by the server can suffice to authorize the use of each hosted application program presented to the client node, although such applications may reside at another server. Accordingly, when the client node launches (i.e., initiates execution of) one of the hosted applications, additional input of user credentials by the user may be unnecessary to authenticate use of that application. Thus, a single entry of the user credentials can serve to determine the available applications and to authorize the launching of such applications without an additional, manual log-on authentication process by the client user.

Either a client node 10, 20 or an application server can launch the Program Neighborhood application as described in connection with FIGS. 2A-2C. The results are displayed on the display screen 12, 22 of the client node 10, 20. In a graphical windows-based implementation, the results can be displayed in a Program Neighborhood graphical window and each authorized application program can be represented by a graphical icon in that window.

One embodiment of the Program Neighborhood application filters out application programs that the client node 10, 20 is unauthorized to use and displays only authorized (i.e., available) programs. In other embodiments, the Program Neighborhood application can display authorized and unauthorized applications. When unauthorized applications are not filtered from the display, a notice can be provided indicating that such applications are unavailable. Alternatively, the Program Neighborhood application can report all applications hosted by the application servers 30, 32, 34, 36 to the user of a client node, without identifying which applications the client node 10, 20 is authorized or unauthorized to execute. Authorization can be subsequently determined when the client node 10, 20 attempts to run one of those applications.

Figure 2A:
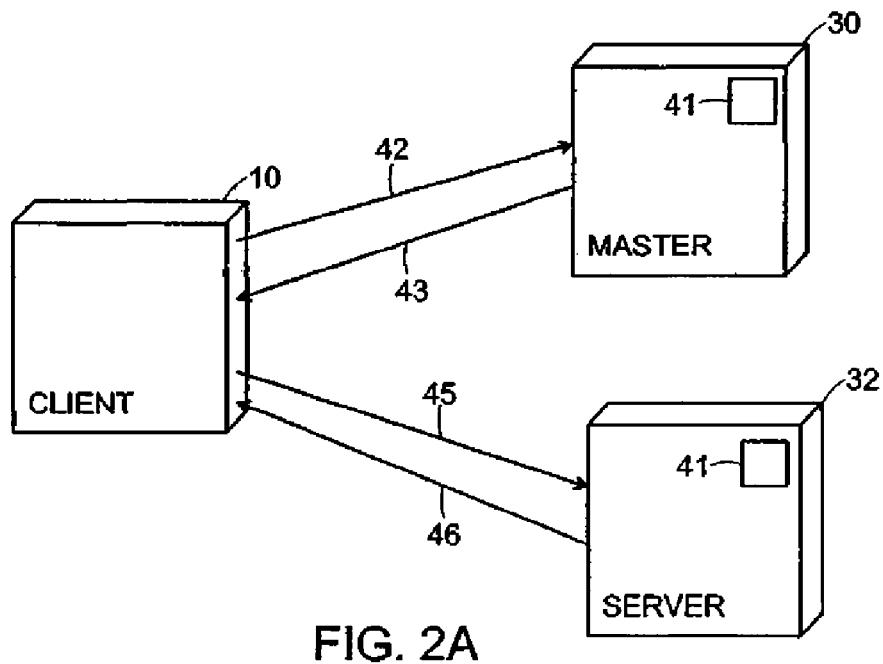
FIG. 2A is a block diagram illustrating an exemplary process by which one of the server nodes can initiate execution of an application program for determining the program neighborhood of a client node.

FIG. 2A shows an exemplary process by which a server launches the Program Neighborhood (PN) application and presents results of the PN application to the client node 10. The server can launch the PN application in response to a request 42 by the client node 10 for a particular application program. The request passes to the master server node, in this example server 30. The master server node 30, taking load-balancing and application availability into account, indicates (arrow 43) to the client node 10 that the sought-after application is available on server 32. The client node 10 and server 32 establish a connection (arrows 45 and 46). By this connection, the server 32 can transfer the executable code of the particular application to the client node 10, when the client node 10 and server 32 are operating according to the client-based computing model. Alternatively, the server 32 can execute the particular application and transfer the graphical user interface to the client node 10, when the client node 10 and server 32 are operating according to the server-based computing model. In addition, either the master server node 30 or the server 32 can execute the Program Neighborhood application 41 and push the results (arrows 43 or 46) back to the client node 10 so that when the client 5 node 10 requests the Program Neighborhood application, the program neighborhood results are available at the client node 10.

Figure 2B:
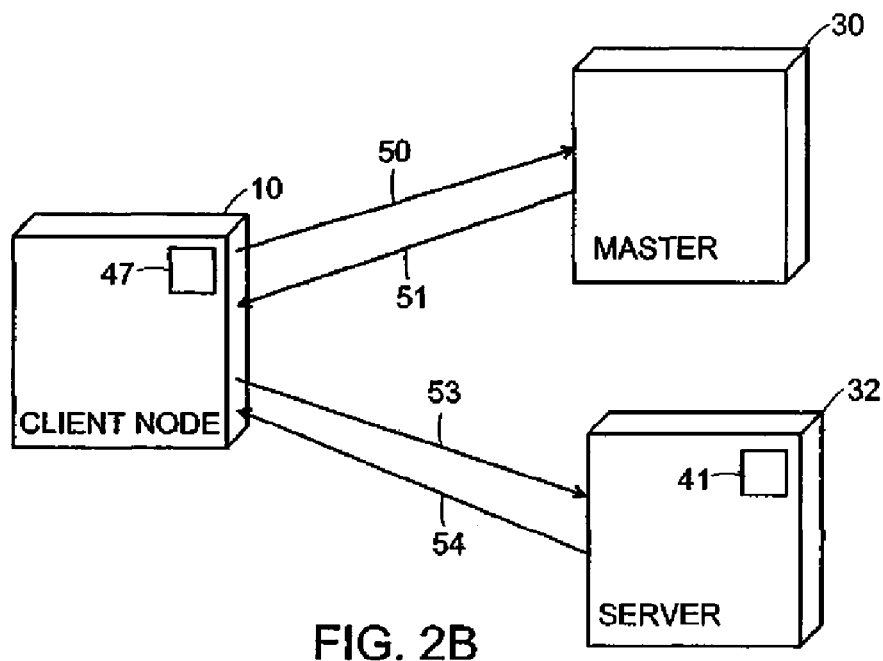
FIG. 2B is a block diagram illustrating an exemplary process by which a client node can initiate execution of an application program for determining the program neighborhood of that client node.

FIG. 2B shows another exemplary process by which the client node 10 initiates execution of the Program Neighborhood application and a server presents the results of the PN application to the client node 10. The client node 10 launches the Program Neighborhood application (e.g., by clicking on the Program Neighborhood icon 41 representing the application). The request 50 for the Program Neighborhood application is directed to the master server node, in this example server 30. The master server node 30 can execute the Program Neighborhood application, if the application is on the master server node 30, and return the results to the client node 10. Alternatively, the master server node 30 can indicate (arrow 51) to the client node 10 that the Program Neighborhood application 41 is available on another server, in this example server 32. The client node 10 and server 32 establish a connection (arrows 53 and 54) by which the client node 10 requests execution of the Program Neighborhood application 41. The server 32 can execute the application 41 and transfer the results (i.e., the graphical user interface) to the client node 10.

Figure 2C:
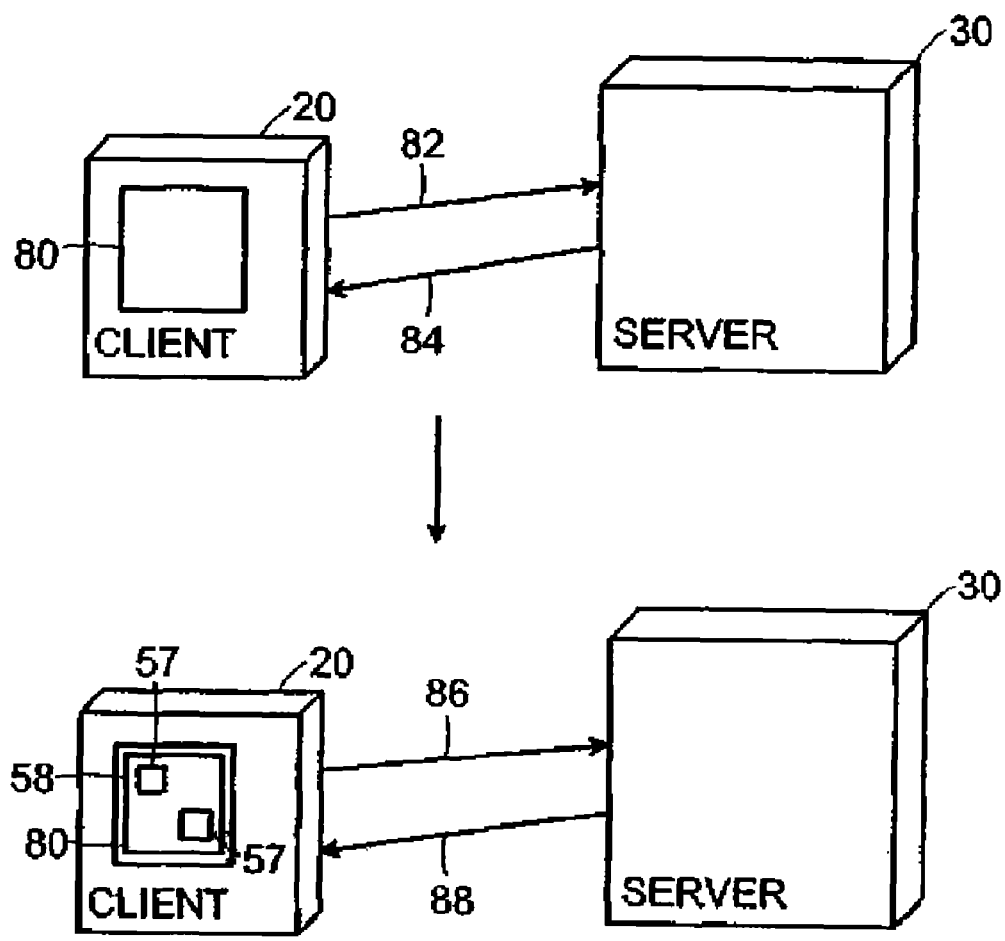
FIG. 2C is a block diagram illustrating an exemplary process by which a client node uses a web browser application to determine its program neighborhood.

FIG. 2C shows another exemplary process by which a client node 20 initiates execution of the Program Neighborhood application, in this example via the World Wide Web. A client node 20 executes a web browser application 80, such as NETSCAPE NAVIGATOR, manufactured by Netscape Communications, Inc. of Mountain View, Calif. or MICROSOFT INTERNET EXPLORER, manufactured by Microsoft Corporation of Redmond, Wash.

The client node 20, via the web browser 80, transmits a request 82 to access a Uniform Resource Locator (URL) address corresponding to an HTML page residing on server 30. In some embodiments the first HTML page returned 84 to the client node 20 by the server 30 is an authentication page that seeks to identify the client node 20.

The authentication page allows the client node 20 to transmit user credentials, via the web browser 80, to the server 30 for authentication. Transmitted user credentials are verified either by the server 30 or by another server in the farm. This allows a security domain to be projected onto the server 30. For example, if the server 30 runs the WINDOWS NT operating system, manufactured by Microsoft Corporation of Redmond, Wash., and the authenticating server runs the UNIX operating system, the UNIX security domain may be said to have been projected onto the server 30. User credentials may be transmitted "in the clear," or they may be encrypted. For example, user credentials may be transmitted via a Secure Socket Layer (SSL) connection, which encrypts data using the RC3 algorithm, manufactured by RSA Data Security, Inc. of San Mateo, Calif.

The server 30 may verify the user credentials received from the client node 20. Alternatively, the server 30 may pass the user credentials to another server for authentication. In this embodiment, the authenticating server may be in a different domain from the server 30. Authenticated user credentials of the client node 20 may be stored at the client node 20 in a per-session cookie, in fields that are not displayed by the web browser 80, or in any other manner common in maintenance of web pages. In some embodiments, a server farm with which the server 30 is associated may allow guest users, i.e., users that do not have assigned user credentials, to access applications hosted by servers in the farm. In these embodiments, the authentication page may provide a mechanism for allowing a client node 20 to identify that it is a guest user, such as a button or menu selection. In other of these embodiments, the server 30 may omit the authentication page entirely.

Still referring to FIG. 2C, once the client node 20 is authenticated by the server 30, the server prepares and transmits to the client node 20 an HTML page 88 that includes a Program Neighborhood window 58 in which appears graphical icons 57, 57' representing application programs to which the client node 20 has access. A user of client node 20 invokes execution of an application represented by icon 57 by clicking that icon 57.

Figure 3A:
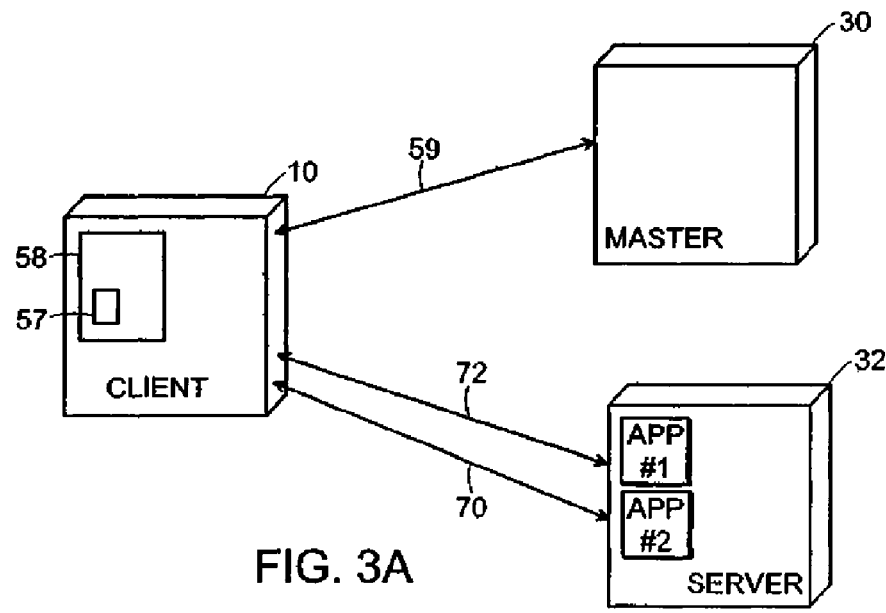
FIGS. 3A, 3B, and 3C are block diagrams illustrating exemplary processes by which a client node can launch an application program from a Program Neighborhood window displayed at that client node.

FIG. 3A shows an exemplary process of communication among the client node 10, the master server node, in this example server 30, and the server 32. The client node 10 has an active connection 72 with the server 32. The client node 10 and server 32 can use the active connection 72 to exchange information regarding the execution of a first application program. The user credentials of the client node 10 are stored at the client node. Such storage of the user credentials can be in cache memory or persistent storage.

In this embodiment, the Program Neighborhood application runs on the client node 10. The client node display has a Program Neighborhood window 58 in which appears a graphical icon 57 representing a second application program. A user of the client node 10 can launch the second application program by double-clicking the icon 57 with the mouse. The request passes to the master server node 30 via a connection

59. The master server node 30 indicates to the client node 10 via the connection 59 that the sought-after application is available on server 32. The client node 10 signals the server 32 to establish a second connection 70. The server 32 requests the user credentials from the client node 10 to authenticate access to the second application program. Upon a successful authentication, the client node 10 and server 32 establish the second connection 70 and exchange information regarding the execution of the second application program. Accordingly, the client node 10 and the server 32 communicate with each other over multiple connections.

Figure 3B:
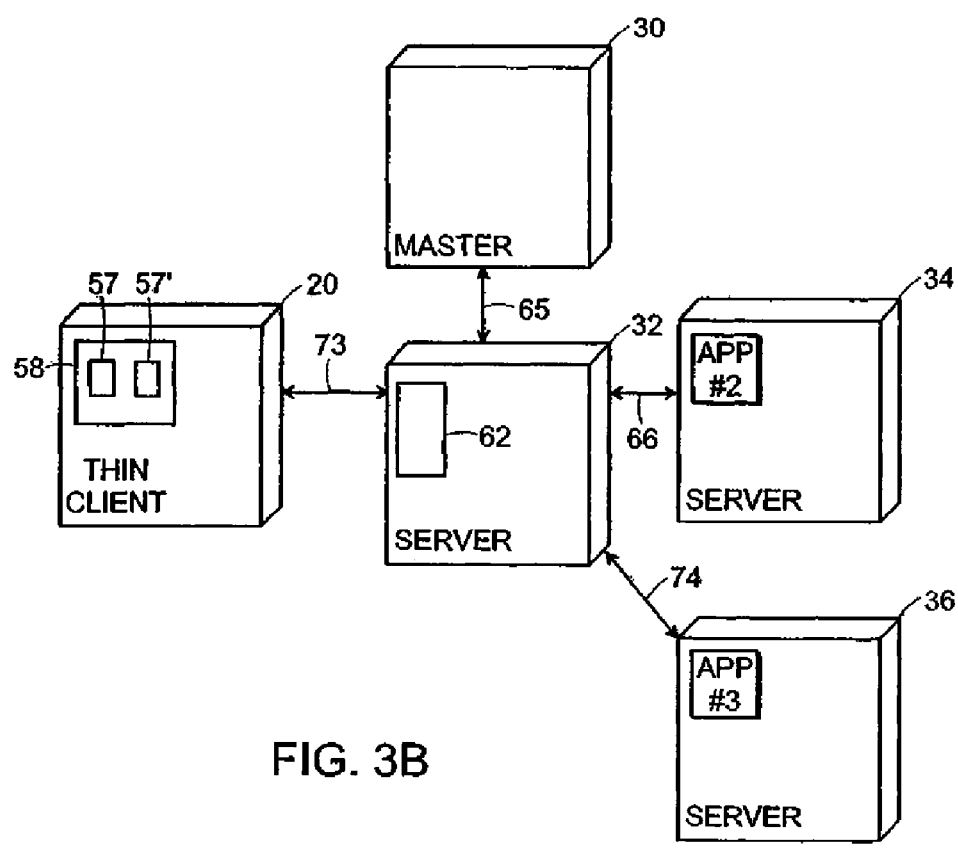

FIG. 3B shows an exemplary process of communication among the client node 20, the master server node, in this example server 30, and servers 32, 34, and 36. The client node 20 has an active connection 73 with the server 32. The client node 20 and server 32 can use the active connection 73 to exchange information regarding the execution of a first application program. The user credentials of the client node 20 are stored at the server 32 in cache memory or in persistent storage.

In this embodiment, the Program Neighborhood application runs on the server 32. The server 32 includes software providing a server-based client engine 62, enabling the server 32 to operate in the capacity of the client node 20. The client node 20 display has a Program Neighborhood window 58 in which appears graphical icons 57, 57' representing a second application program and a third application program, respectively. A user of the client node 20 can launch the second application program by double-clicking the icon 57. The request to launch the second application program passes to the server 32 via active connection 73, and the server 32 forwards the request to the master server node 30 (arrow 65).

The master server node 30 indicates (arrow 65) to the server 32 that the sought-after application is available on server 34. The server 32 contacts the server 34 to establish a connection 66. To authenticate access to the application, the server 34 obtains the user credentials of the client node 20 from the server 32. The server 32 and server 34 establish the connection (arrow 66) by which the server 32 requests execution of the second application and the server 34 returns the graphical user interface results to the server 32. The server 32 forwards the graphical user interface results to the client node 20, where the results are displayed. Accordingly, the information exchanged between the client node 20 and the server 34 "passes through" the server 32.

Similarly, the client node 20 can launch the third application program by double-clicking the icon 57'. The request to launch the third application program passes to the server 32. The server 32 forwards the request to the master server node 30, which considers load-balancing and application program availability to determine which server can handle the request. In this example, the master server node indicates that the server 36 can run the third application program.

The server 32 and the server 36 establish a connection (arrow 74) by which the server 32 requests execution of the third application program, and the server 36 returns the graphical user interface results to the server 32. To permit execution of the third application program, the server 36 can authenticate the user credentials of the client node 20, which are obtained from the server 32. The server 32 forwards the graphical user interface results to the client node 20 where the results are displayed. Accordingly, the results of executing the third application program pass between the client node 20 and the server 36 through the server 32.

From this illustration it should be understood that client node 20 can run multiple application programs through one connection with the server 32, while the server 32 maintains multiple connections (in this example, one connection with server 34 and a second connection with server 36). Also, the server 32 merges the information received from the server 34 with the information received from the server 36 into one data stream for transmission to the client node 20.

Figure 3C:
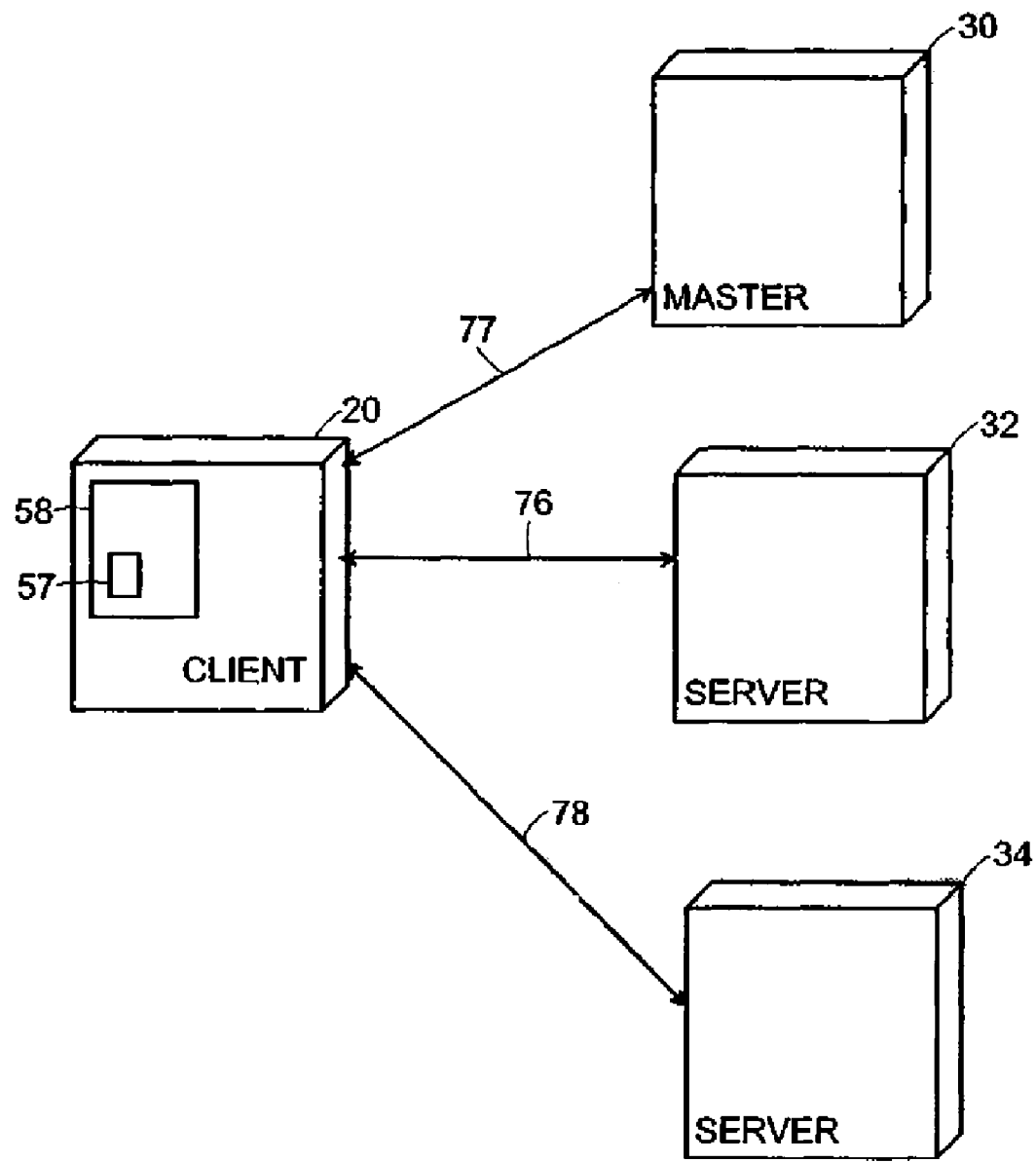

FIG. 3C shows an exemplary process of communication among the client node 20, the master server node, in this example server 30, and servers 32 and 34. The client node 20 has an active connection 76 with the server 32. The client node 20 and server 32 can use the active connection 76 to exchange information regarding the execution of a first application program. The client node 20 can store the user credentials in cache memory or in persistent storage.

In this embodiment, the Program Neighborhood application runs on the server 32. The client node 20 display has a Program Neighborhood window 58 in which appears a graphical icon 57 representing a second application program. A user of the client node 20 can launch the second application program by double-clicking the icon 57. The request to launch the second application program passes to the server 32. The server 32 responds (i.e., "calls back") to the client node 20 by returning application-related information such as the name of the application and capabilities needed by the client node 20 for the second application to run.

With the information provided by the server 32, the client node 20 then communicates with the master server node 30 via connection 77 to determine the server for executing the second application program. In this example, that server is server 34. The client node 20 then establishes a connection 78 to the server 34. Server 34 requests the user credentials from the client node 20 to authenticate the user of the client node 20. The second application program executes on the server 34, and the server 34 returns the graphical user interface to the client node 20 via the established connection 78. Accordingly, the client node 20 can have multiple active connections between the multiple servers.

Figure 3D:
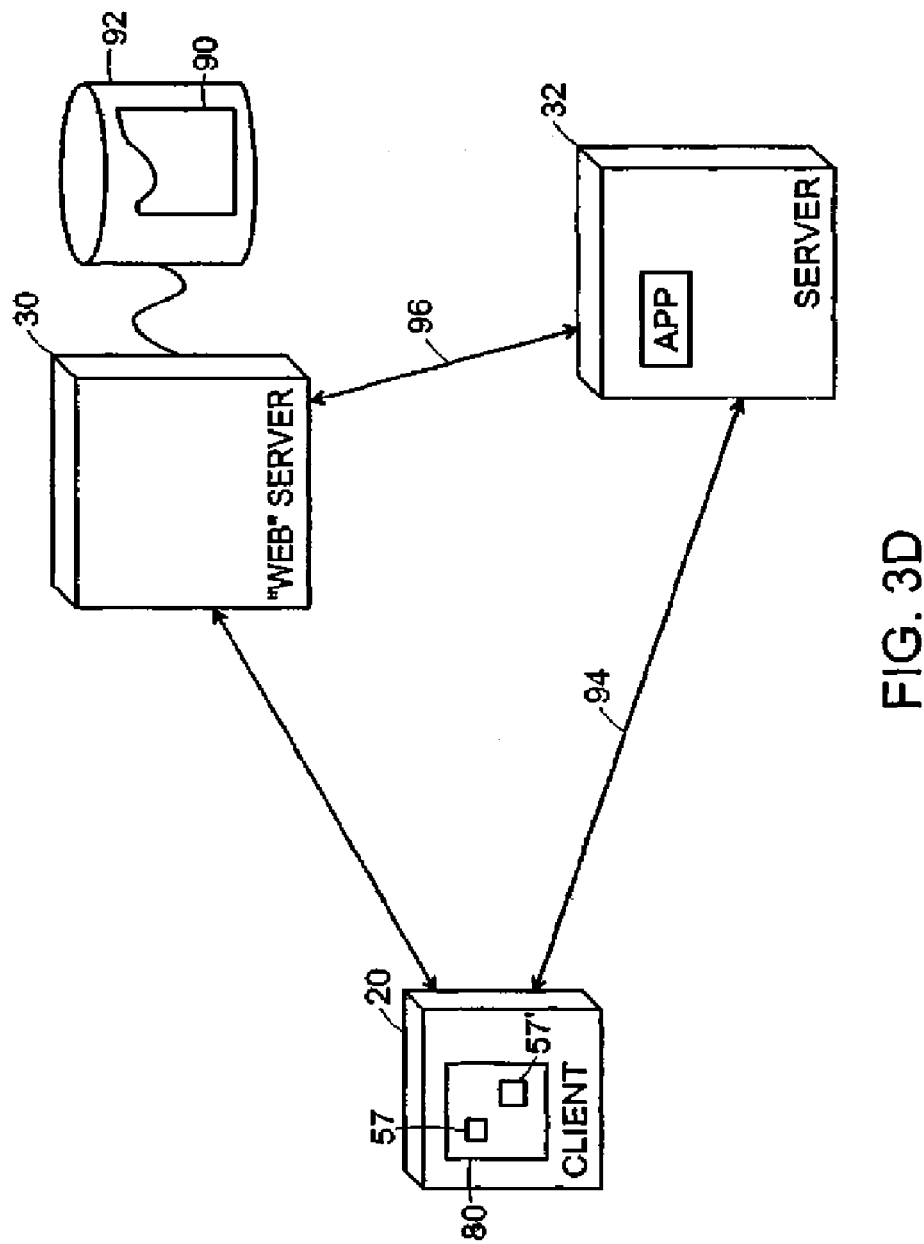
FIG. 3D is a block diagram illustrating an exemplary process by which a client node can launch an application program from a Program Neighborhood web page displayed at that client node.

FIG. 3D shows an exemplary process of communicating between the client node 20, a server 30 that in this example acts as a web server, and the server 32. The client node 20 authenticates itself to the server 30 as described above in connection with FIG. 2C. In one embodiment, the server 30 accesses an output display template 90, such as an SGML, HTML or XML file, to use as a base for constructing the Program Neighborhood window to transmit to the client node 20. The template may be stored in volatile or persistent memory associated with the server 30 or it may be stored in mass memory 92, such as a disk drive or optical device, as shown in FIG. 3D.

In this embodiment, the template 90 is a standard SGML, HTML, or XML document containing Program Neighborhood-specific tags that are replaced with dynamic information. The tags indicate to the server 30 where in the output display to insert information corresponding to available applications, such as icon images. In one particular embodiment, the Program Neighborhood-specific tags are embedded within comments inside a file, allowing the file to remain compatible with standard interpreters. In another embodiment, the Program Neighborhood-specific tags are extensions of the markup language used as the base for the template.

Examples of HTML tags that may be used in a template in accordance with the present invention are set forth below in Table 1:

TABLE 1

| Tag | Description |
| --- | --- |
| ControlField_/zeW value | This tag is used to set the value of data that either persists between Program Neighborhood web pages, is set by the user, or is used to help in cross page navigation, such as user name, domain, password, template, and application. |
| DrawProgramNeighborhood | This tag is used to draw a Program Neighborhood display at this location in an output display. |
| AppName | This tag is replaced by the name of the published application in the current context. |
| WindowType | This tag is replaced by the window type of the published application in the current context. |
| WindowHeight | This tag is replaced by the window height of the published application in the current context. |
| WindowWidth | This tag is replaced by the window width of the published application in the current context. |
| WindowScale | This tag is replaced by the window scale of the published application in the current context. |
| WindowColors | This tag is replaced by the color depth of the published application in the current context. |
| SoundType | This tag is replaced by the sound setting of the published application in the current context. |
| VideoType | This tag is replaced by the video setting of the published application in the current context. |
| EncryptionLevel | This tag is replaced by the encryption level of the published application in the current context. |
| Icon | This tag is replaced by the icon of the published application in the current context. |

Other tags can be provided to set control fields and to provide conditional processing relating to the Program Neighborhood application.

In one embodiment, the template is constructed dynamically using, for example, COLD FUSION, manufactured by Allaire Corp. of Cambridge, Mass. or ACTIVE SERVER SERVER PAGES manufactured by Microsoft Corporation of Redmond, Wash. Alternatively, the template may be static. The Program neighborhood application parses the template, replacing Program Neighborhood-specific tags as noted above. Tags that are not Program Neighborhood-specific are left in the file to be parsed by the browser program 80 executing on the client 20.

In one embodiment, a template parser object is provided that accepts an HTML template as input, interprets Program Neighborhood-specific tags present in the template, and outputs the original template with all Program Neighborhood tags replaced with appropriate text. The template parser object can be passed a cookie, a URL query string, or a control field from a web server interface to provide the information with which Program Neighborhood-specific tags should be replaced.

In another embodiment, the Program Neighborhood application allows scripts to access to information via an application programming interface. Scripts may be written in, for example, VBScript or Jscript. In this embodiment, the scripting language is used to dynamically generate an output display using information returned by the application in response to queries posed by the script. Once the output display is generated, it is transmitted to client node 20 for display by the browser program 80.

Figure 4:
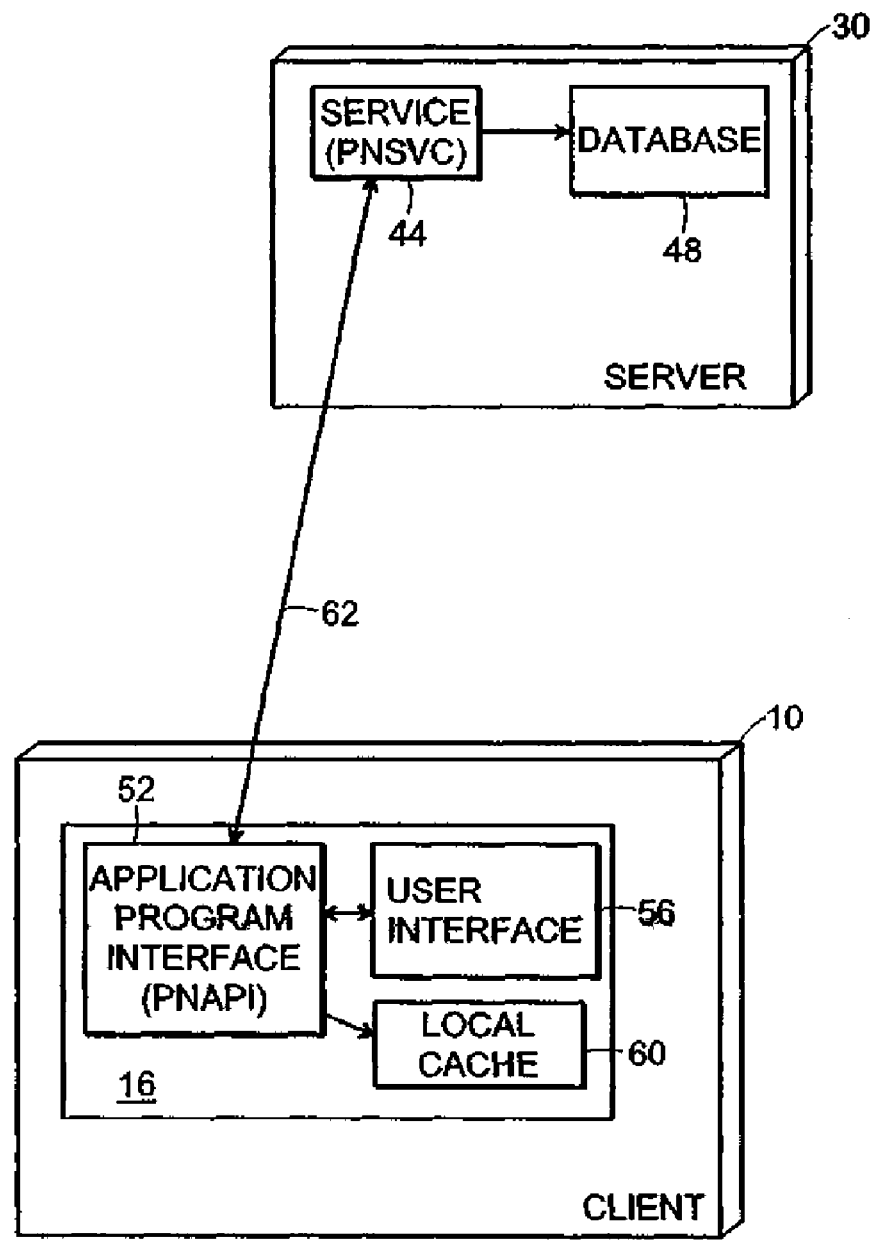
FIG. 4 is a block diagram of a client-based computing embodiment in which a client node having an installed program neighborhood application of the invention is in communication with one of the server nodes.

A user of the client node 20 can launch an application by double-clicking with a mouse an icon 57, 57' displayed in the Program Neighborhood web page. In some embodiments, each icon 57, 57' is an encoded URL that specifies: the location of the application (i.e., on which servers it is hosted or, alternatively, the address of a master server); a launch command associated with the application; and a template identifying how the output of the application should be displayed (i.e., in a window "embedded" in the browser or in a separate window). In some embodiments, the URL includes a file, or a reference to a file, that contains the information necessary for the client to create a connection to the server hosting the application. This file may be created by the Program Neighborhood application dynamically. The client node 20 establishes a connection (arrow 94) with the server identified as hosting the requested application (in this example, server 32) and exchanges information regarding execution of the desired application. In some embodiments, the connection 94 is made using the Independent Computing Architecture (ICA) protocol, manufactured by Citrix Systems, Inc. of Fort Lauderdale, Fla. Thus, the client node 20 may display application output in a window separate from the web browser 80, or it may "embed" application output within the web browser. FIG. 4 illustrates an exemplary arrangement of program components for a client-based implementation of the Program Neighborhood application. A client-based implementation of Program Neighborhood application can be used in a network using either the server-based computing model in which the servers execute the Program Neighborhood application or the client-based computing model in which the client node 10 executes the Program Neighborhood application locally. The Program Neighborhood application includes a Program Neighborhood Service (PNSVC) component 44, an Application Database component 48, a Program Neighborhood Application Program Interface (PNAPI) component 52, a Program Neighborhood User Interface component 56, and a local cache 60.

The application server 30, for example, includes the service component (PNSVC) 44 and the application database 48. The client node 10, which is a representative example of a client node that can support a client-based implementation of the Program Neighborhood application, includes the application program interface PNAPI 52, the user interface user interface component 56, and the local cache 60 components. The PNAPI 52 communicates with the user interface component 56 and the local cache 60. The PNSVC 44 communicates with the application database 48 and with the PNAPI 52 on the client node 10 via communications link 62.

The communications link 62 can be established by, for example, using the ICA protocol. ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that can be used by application-layer code to issue commands for exchanging data. The virtual channel commands are designed to be closely integrated with the functions of client nodes. One type of virtual channel connection supported by the ICA protocol is a Program Neighborhood virtual channel. The Program Neighborhood virtual channel protocol can include four groups of commands:

(1) initialization-related commands;
(2) single authentication related commands that can be supported by each client node wanting a copy of the user credentials;

(3) application data related commands for implementing the Program Neighborhood user interface; and (4) application launch callback-related commands for running the user interface on an application server.

Application Database

The application database 48 is a cache of the authorized user and group information for all the public (i.e., published) applications in a server farm or in a group of trusted domains. Each server in a server farm can maintain its own application-related information in persistent storage and build up the database 48 in volatile storage. In another embodiment, all collected application-related information in the database 48 can be stored in persistent storage and made accessible to each other server in the server farm. The database 48 can be implemented in a proprietary format (e.g., as a linked list in memory) or using Novell's Directory Services (NDS) or any directory service adhering to the X.500 standard defined by the International Telecommunication Union (ITU) for distributed electronic directories.

The application database 48 includes a list of application servers. Each server in the list has an associated set of applications. Associated with each application is 20 application-related information that can include the application name, a list of servers, and client users that are authorized to use that application. An overly-simplified example of the application-related information maintained in the database is illustrated by the following Table 2. Users A and B are users of the client nodes 10, 20, "n/a" indicates that the application is hosted, but is not available to client node users, and "-" indicates that the application is not hosted.

TABLE 2

| Server Name | Applications | | | |
|---|---|---|---|---|
| | Spreadsheet | Customer Database | Word Processor | Calculator |
| Server 30 | User A | User B | n/a | — |
| Server 32 | User B | n/a | User A | — |
| Server 34 | | | | User A User B |

Table 2 shows a list of servers 30, 32, 34, the applications hosted by the servers, (Spreadsheet, Customer Database, Word Processor, and Calculator), and those users who are authorized to use the applications. For example, the server 30 hosts the Spreadsheet program, the Customer Database and the Word Processor. User A is authorized to use the Spreadsheet, User B is authorized to use the Customer Database, and no users are authorized to use the Word Processor. It is to be understood that other techniques can be used to indicate who is authorized to use a particular application. For example, the user information stored in the database can be used to indicate those users who are unauthorized to use a particular application rather than those who are authorized.

To obtain the information that is stored in the database 48, the server 30 obtains the application-related information from each other server in the server farm regarding the applications on those servers, including control information that indicates which client users and servers are permitted to access each particular application. The application-related information maintained in the database may or may not persist across re-boots of the server 30.

The application database 48 can be a central database that is stored at the application servers 30, 32, and 34 and are accessible to all of the servers in the server farm. Accordingly, the application-related information can be available for use by other servers such as those servers that perform published application authentication during session log-on and application launching. In another embodiment, the application database 48 can be maintained at each of the application servers 30, 32, and 34 based upon the information that each server obtains from communications with each other server in the server farm.

Program Neighborhood Service Program (PNSVC)

Each server 30, 32, 34 and 36 having the Program Neighborhood application installed thereon executes the PNSVC software 44. The PNSVC software 44, operating on each server 30, 32, 34 and 36 establishes a communication link (e.g., a named pipe) with each other server. The servers 30, 32, 34 and 36 exchange the application-related information on the named pipes. In another embodiment, the PNSVC software 44 collects the application-related information from the other servers in the server farm through remote registry calls (e.g., the service component 44 transmits a datagram to other servers in the plurality requesting the application-related information corresponding to the application programs hosted by those servers). The PNSVC 44 software also maintains the relationships of groups and users to published applications in the application database 48 and accesses the information when authenticating a client user. An administrator of the server 30 can use a user interface to configure the PNSVC 44.

Other functions of the PNSVC software 44 include implementing the services and functions requested by the PNAPI 52 and communicating with the PNAPI 52 on the client node 10 using a Program Neighborhood virtual device driver (VDPN). The VDPN operates according to the Program Neighborhood virtual channel protocol described above for establishing and maintaining an ICA connection.

Program Neighborhood Application Program Interface (PNAPI)

The PNAPI 52 is a set of software functions or services that are used by the Program Neighborhood application to perform various operations (e.g., open windows on a display screen, open files, and display message boxes). The PNAPI 52 provides a generic mechanism for launching application objects (e.g., icons) produced by running the Program Neighborhood application and application objects in a legacy (i.e., predecessor or existing for some time) client user interface. When the client node 10 launches an available application, the launch mechanism can launch the application on the server 30, if necessary (e.g., when the client node 10 does not have the resources to locally execute the application).

The PNAPI 52 provides all published application information to the user interface component 56 for display on the screen 12 (FIG. 1) of the client node 10. The PNAPI 52 also manages server farm log-ons in a local database of logon credentials (e.g., passwords) for users of the client node 10 to support the single authentication feature. Credentials may or may not be persistent across bootings (power-off and on cycles) of the client node 10.

The PNAPI 52 provides automatic and manual management for Program Neighborhood application objects stored in the local cache 60. The local cache 60 can either be refreshed manually by the user of the client node 10, or at a user-definable refresh rate, or by the server at any time during a connection. In a WINDOWS implementation, the PNAPI 52 can build remote application file associations and manage the "Start" menu and desktop icons for application object shortcuts.

Program Neighborhood User Interface

The user interface module 56 interfaces the PNAPI 52 and can be a functional superset of an existing client-user interface (e.g., Remote Application Manager). The user interface module 56 accesses the information stored in the local cache 60 through the PNAPI 52 and visually presents that information to the user on the display screen 12 (FIG. 1) of the client node 10. The displayed information is a mixture of information generated by a user of the client node 10 and information obtained by the Program Neighborhood application. The user interface module 56 can also show the user all applications that the user is currently running and all active and disconnected sessions.

In a windows-based embodiment, the user interface module 56 can present a variety of graphical components, such as windows and pull-down menus, to be displayed on the display screen 12 (FIG. 1). A display of a combination of such graphical user interface components is generally referred to as a "desktop." A desktop produced by the user interface module 56 can include a Program Neighborhood window displaying the neighborhood of application programs available to the user of the client node 10 for use. These application programs are a filtered combination of the published applications hosted by a server farm on the network. The user interface module 56 can generate a Program Neighborhood window for each server farm or merge the applications from different server farms under a single Program Neighborhood window.

At a top level, the Program Neighborhood window includes a folder for each server farm. Clicking on one of the folders with the mouse 18 (FIG. 1) produces a window containing a representation (e.g., an icon) of each hosted application available to the user, e.g., see FIGS. 6A and 6B. The Program Neighborhood window becomes the focal point for launching published applications, and the user interface module 56 can be used to launch applications through the PNAPI 52. For example, the user of the client node 10 can use the mouse 18 to select one of the displayed icons and launch the associated application.

A feature of a client-based implementation is that the user can browse the objects displayed in the Program Neighborhood window although the client node is offline, that is, the ICA connection 62 is inactive. Also, a user of the client node 10 can drag application objects and folders out of the Program Neighborhood window and into other graphical components (e.g., other windows, folders, etc.) of the desktop.

Figure 5:
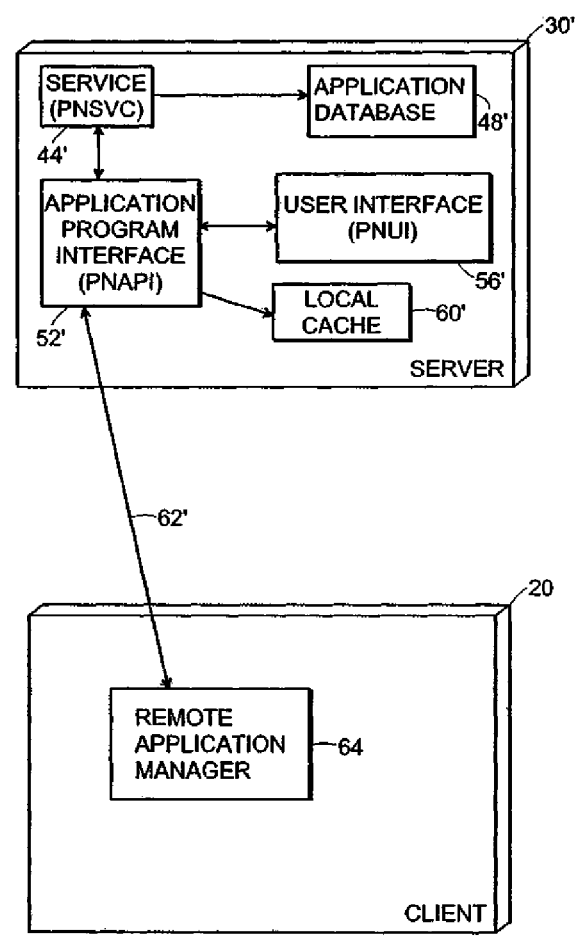
FIG. 5 is a block diagram of a server-based computing embodiment in which a client node is in communication with a server node having an installed program neighborhood application program of the invention.

FIG. 5 shows an exemplary arrangement of program components for a server-based implementation of the Program Neighborhood application. The components include a Service (PNSVC) component 44', an Application Database component 48', an Application Program Interface (PNAPI) component 52', a User Interface component 56' and a local cache 60'. Each software component 44', 48', 52', 56', and 60' is installed on the application server 30'. The software components for the server-based implementation correspond to the software components for the client-based implementation of FIG. 4. The functionality of each server-based software component is similar to the client-based counterpart, with differences or added capabilities described below. The PNSVC 44' communicates with the application database 48' and with the PNAPI 52' using local procedure calls. The PNAPI 52' also communicates with the user interface module 56' and the local cache 60'.

Similar to that described in FIG. 4 for the client node 10, the client node 20 logs on to the network 40 (FIG. 1), the server 30' develops and maintains a database containing the application related information collected from the other servers 32, 34 in the server farm, and a communication link is established between the server 30' and the client node 20. The application server 30' is in communication with the client node 20 via an ICA channel connection 62'. The channel connection 62' can be established by an ICA virtual channel protocol (e.g., Thinwire). The Thinwire protocol can be used to transmit presentation commands from Windows-based applications running on the application server 30' to the client node 20. To a user of the client node 20, the applications appear to be running on the client node 20. The client node 20 can include a Remote Application Manager application program 64 that communicates with the application server 30' via the ICA channel connection 62'.

To run the Program Neighborhood application in a server-based implementation, the user of the client node 20 connects to an initial desktop (at the server 30') and launches the Program Neighborhood application from within that desktop environment. The connection to the initial desktop can occur automatically, e.g., via a logon script of the client node 20, via an entry in the StartUp group in WINDOWS 95, or by another centrally managed server specific mechanism. All remote application management and launching is accomplished through this initial desktop.

Similar to that described in FIG. 4 for the server 30, the server 30' uses the user credentials to determine those application programs that are authorized for use by the user of the client node 20. A Program Neighborhood graphical window is returned to the client node 20 and displayed on the client screen 22 (FIG. 1). This window can contain icons representing the available and, possibly, the unavailable application programs that are in the program neighborhood of the client node 20.

The user of the client node 20 can select and launch one of the application programs displayed in the Program Neighborhood window. When launching an application, the Program Neighborhood application can execute the application on the same server 30', where applicable, taking into account load balancing requirements among servers and the availability of the application on that server 30'. The PNAPI 52' can include a launch mechanism for launching a remote application locally on the server 30' when the server 30' is nominated to launch the application. When a different server is needed to run the application, the Program Neighborhood application can launch the application via the server 30' (i.e., server-based client) using the windows to present the application on the desktop of the client node 20 as described above in FIG. 3B.

In one embodiment, the web-based Program Neighborhood application includes a group of objects that manage various aspects of the application. In one embodiment, the application includes three primary object classes that "plug in" to a web server: a gateway object class; a credentials object class; and an applications object class. In some specific embodiments, the object classes are provided as JAVA BEANS. The three primary object classes facilitate: validation of user credentials into a server farm; generation of lists of published applications that a specified user may access; provision of detailed information about a specific published application; and conversion of published application information into an ICA-compatible format.

When provided as JAVA BEANS, the objects can be accessed in a number of different ways. For example, they may be compiled as COM objects and made available to the web server as ACTIVEX components. In another embodiment, the JAVA BEANS can be used in their native form, such as when the server uses JAVA Server Pages technology. In yet another embodiment, the JAVA BEANS can be instantiated and used directly in a JAVA servlet. In still another embodiment, the server 30 can instantiate the JAVA BEANS as COM objects directly.

A credentials object class manages information necessary to authenticate a user into a target server farm. A credentials object passes stored user credentials to other Program Neighborhood objects. In some embodiments, the credentials object is an abstract class that cannot be instantiated and represents a user's credentials. Various class extensions may be provided to allow different authentication mechanisms to be used, including biometrics, smart cards, token-based authentication mechanisms such as challenge-response and time-based password generation, or others. For example, a "clear text credentials" extension may be provided that stores a user's name, domain, and password in plain text.

A gateway object class handles communications with a target server farm. In one embodiment, the gateway object class is provided as an abstract JAVA class that cannot be instantiated. A particular gateway object may retrieve application information by communicating with a server farm using a particular protocol, reading cached application information, a combination of these two methods, or other various methods.

As noted above, the gateway object class caches information to minimize communication with a target server farm. Extensions to the gateway object may be provided to communicate with the server farm over specific protocols, such as HTTP. In one embodiment, an extension class is provided that allows the gateway object to communicate with the server farm via WINDOWS NT named pipes. The gateway object may provide an application programming interface hook that allows other Program Neighborhood objects to query the object for application information.

An applications object class contains information about published applications and returns information about applications hosted by the server farm in order to create the Program Neighborhood web page. The applications object class creates objects representing applications by retrieving information relating to the applications, either from an object created by the gateway object or directly from the servers in the server farm. An applications object acts as a container for certain properties of the application, some settable and some not settable, such as: the name of the application (not settable); the percentage of the client's desktop that the client window should occupy (settable); the width of the client window, in pixels, for this application (settable); the height off the client window, in pixels, for this application (settable); the number of colors to use when connecting to the application (settable); the severity of audio bandwidth restriction (settable); the level of encryption to use when connecting to the application (settable); the level of video to use when connecting to this application (settable); whether the application should be placed on a client's start menu (settable); whether the application should be placed on the client's desktop (settable); the identity of the Program Neighborhood folder to which the application belongs (settable); the description of the application (settable); the source of the graphics icon file for the application (settable); the type of window that should be used when connecting to the application (not settable); and whether to override default parameters for the object.

Figure 6A:
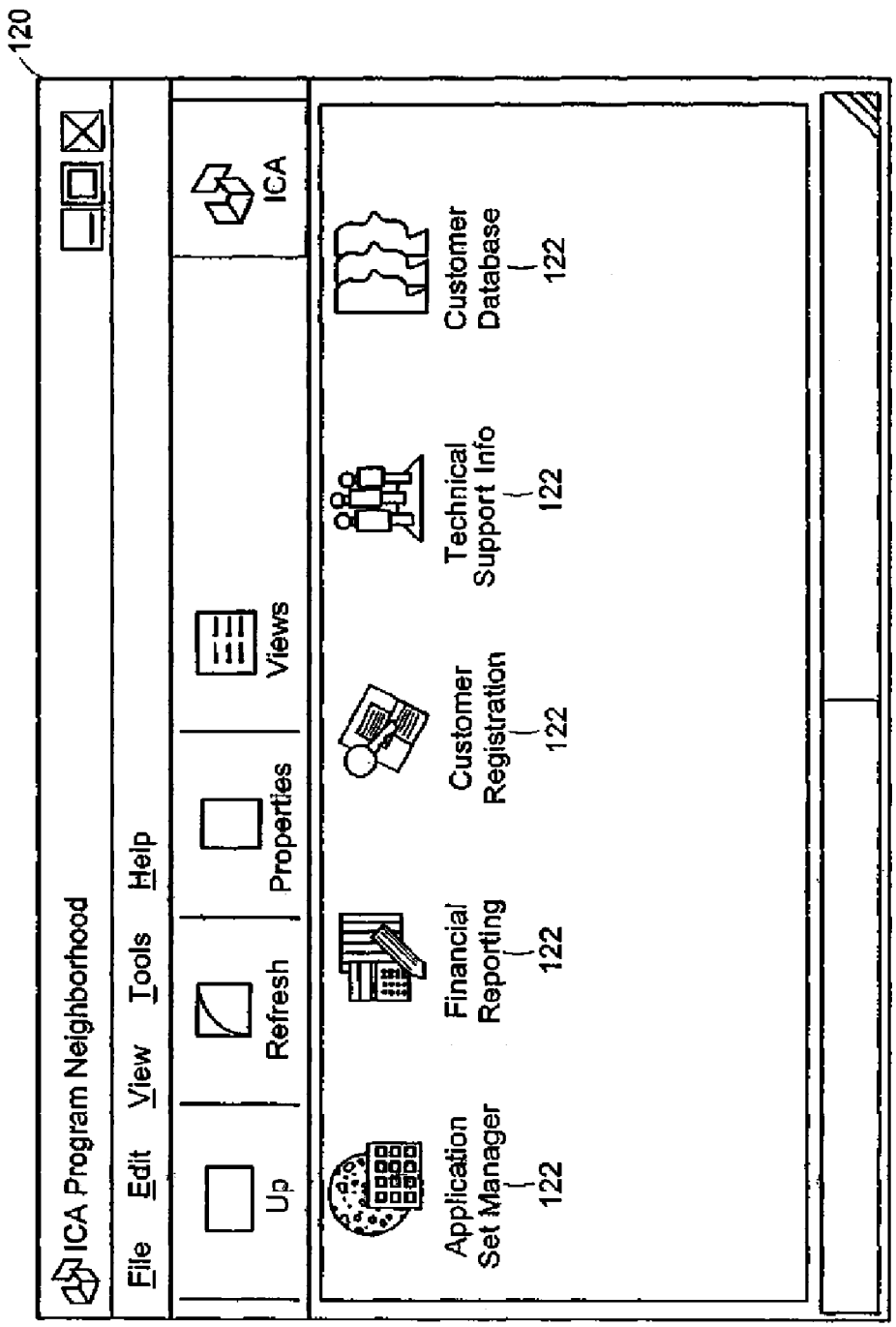
FIG. 6A is a screen shot of an exemplary display on the display screen of a client node after the program neighborhood application program of the invention is executed.

FIG. 6A is a screenshot of an exemplary Program Neighborhood window 120 that can be displayed on the screen 18, 22 (FIG. 1) of either client node 10, 20 after the Program Neighborhood application has executed. The window 120 includes graphical icons 122. Each icon 122 represents an application program that is hosted by one of the servers 30, 32, 34 and 36 on the network 40 (FIG. 1). Each represented application is available to the user of the client node for execution. The user can select and launch one of the applications using the mouse 18, 28 or keyboard 14, 24.

Figure 6B:
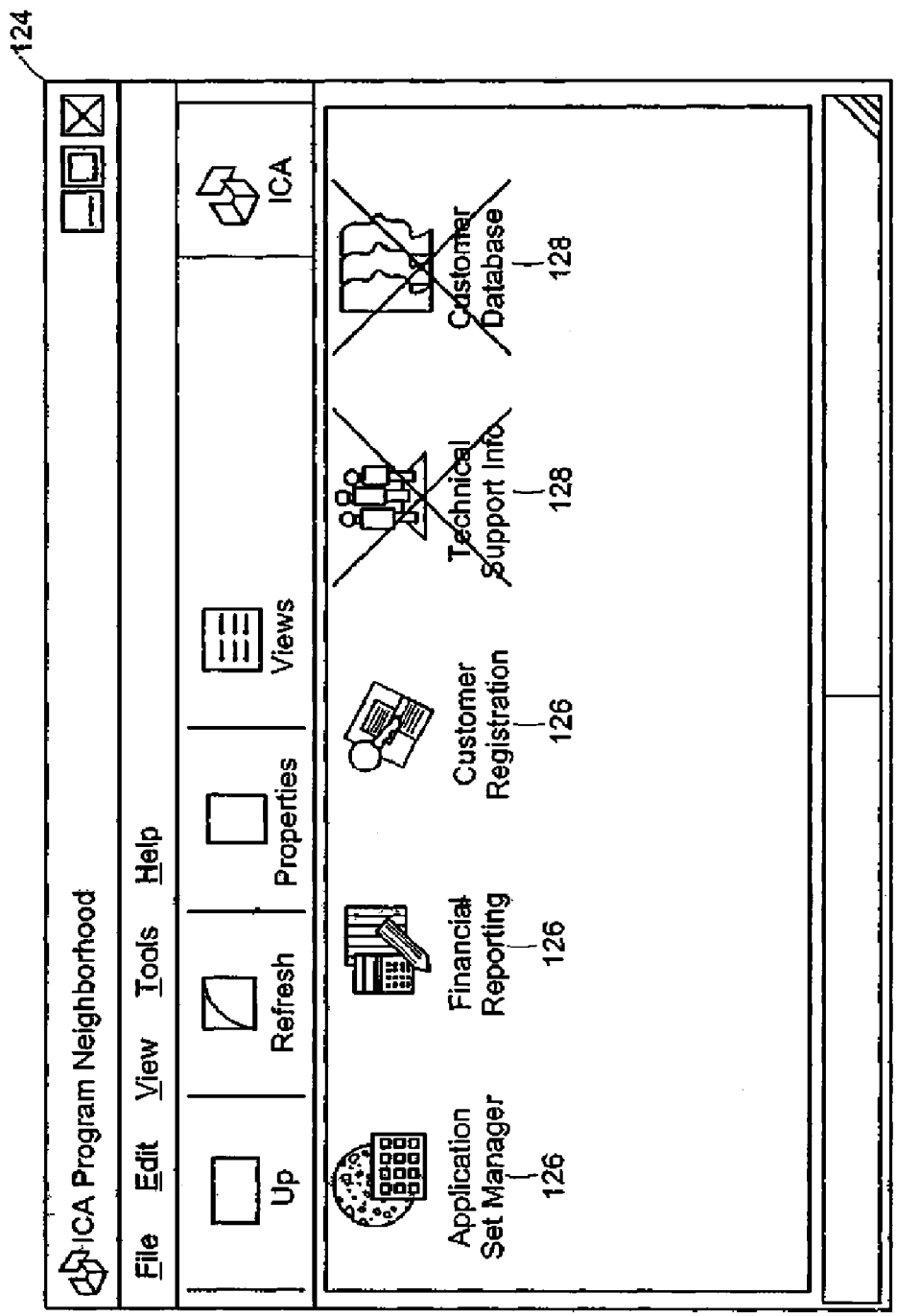
FIG. 6B is a screen shot of another exemplary display on the display screen of a client node after the program neighborhood application program of the invention is executed.

FIG. 6B is a screenshot of another exemplary Program Neighborhood window 124 that can be displayed on the screen 12, 22 (FIG. 1) of either client node 10, 20 after the Program Neighborhood application has executed. The window 124 includes graphical icons 126, 128. Each icon 126, 128 represents an application program that is hosted by one of the servers 30, 32, 34 and 36 on the network 40 (FIG. 1). Each application program represented by one of the icons 126 is available to the user of the client node 10, 20 for execution. The user can select and launch one of the applications using the mouse 18, 28 or keyboard 14, 24. For web-based program neighborhood environments, the screenshots of FIGS. 6A and 6B are similar, except that icons 122, 166, 128 are displayed within a browser window.

Each application program represented by one of the icons 128 is unavailable to the user of the client node 10, 20 (FIG. 1), although such applications are present in the server farm. The unavailability of these application programs can be noted on the display screen (e.g., "X"s can be drawn through the icons 128). An attempt to launch such an application program can trigger a message indicating that the user is not authorized to use the application.

Figure 7:
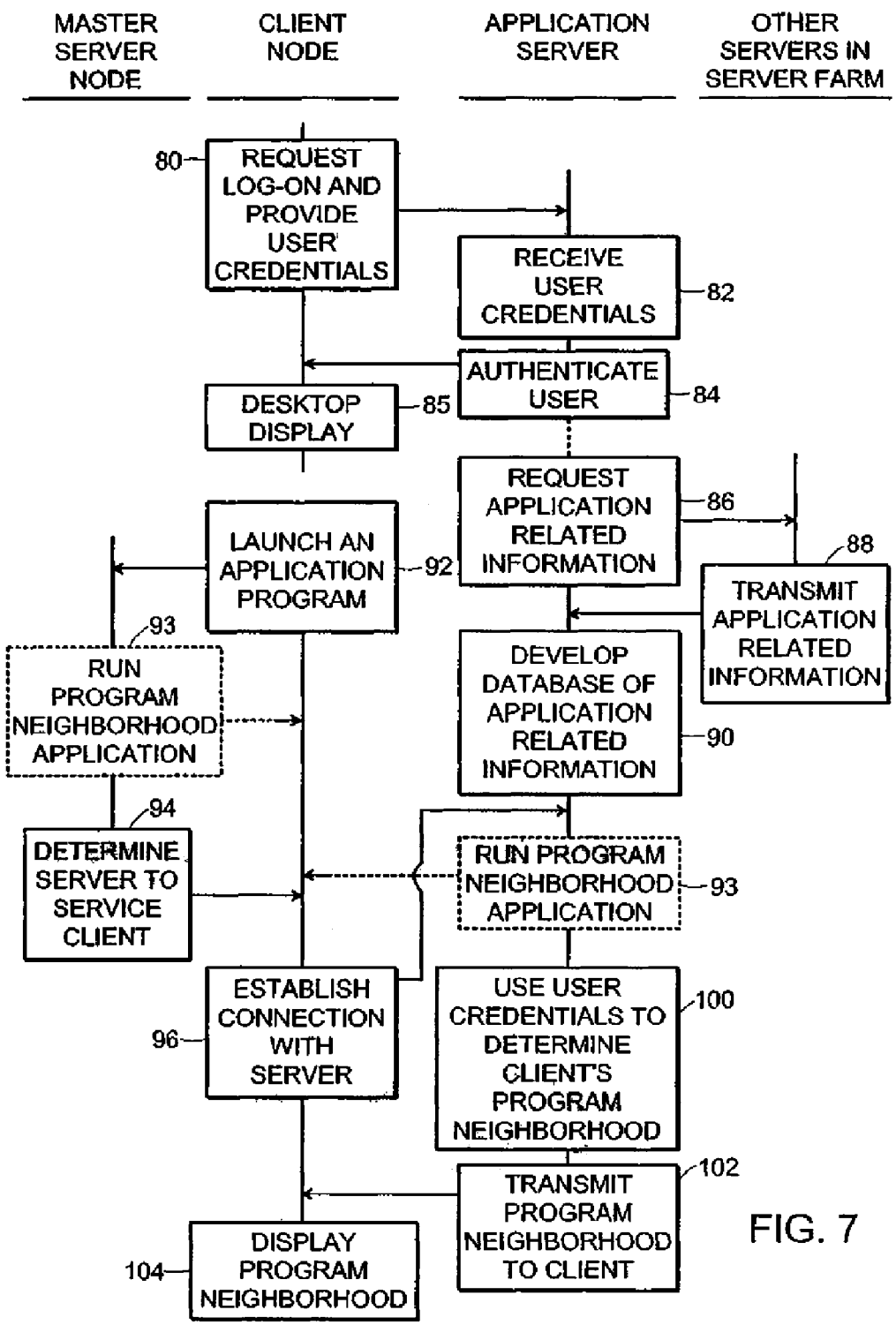
FIG. 7 is a flow chart representation of an embodiment of a process by which a client node is informed as to the availability for use of application programs on the application servers.

FIG. 7 shows an exemplary process by which a user of either client node 10, 20 can be informed about the availability of applications hosted by application servers 30, 32, 34 and 36 on the network 40 (FIG. 1). In step 80, the client node 10, 20 requests log-on service from one of the servers, e.g., server 32. The server 32 requires valid user credentials to establish the connection. The server 32 receives the user credentials from the client node 10 (step 82), and authenticates the user for log-on (step 84). A desktop is displayed at the client node 10, 20 (step 85). The desktop can include a graphical icon representing the Program Neighborhood application program.

In step 86, the application server 32 establishes a connection with each other servers 30, 34 and 36 to exchange application-related information, as described above, corresponding to application programs hosted on those servers (step 88). In step 90, the application server 32 develops and maintains a database of the collected application-related information. Each other server 30, 34, 36 in the server farm can develop a database equivalent to the database of the server 32 and in similar manner as the server 32. In another embodiment, the database of the server 32 can be a centralized database that is accessible to each other application server 30, 34, 36 in the server farm. The collecting of application-related information can occur independently or be triggered by the request of the client node 10, 20 to log-on to the server farm 38.

In step 92, the client node 10, 20 can request execution of an application program from the desktop display. The master server node can process the request and, using a load-balancing evaluation and application availability as described above, determine the application server to provide the service to the client node 10, 20 (step 94). For example, the application server 32 can be selected to service the request with the client node 10, 20. In step 96, the client node 10, 20 establishes a communications link with the server 32. The server 32 and the client node 10, 20 can communicate according to the ICA protocol appropriate for that client node as described above.

Also in response to this request to run the application program, the master server node 30 or the server 32 can run the Program Neighborhood application (step 93) and push the results to the client node 10, 20, although the client node 10, 20 may not have requested the PN application program. When executing the PN application program, the master server node 30 or server 32 filters the application-related information in the database using the user credentials (step 100). The result of filtering the database determines those application programs that are authorized for use by the user of the client node 10, 20. The authorized application programs are in the program neighborhood of the client node 10, 20. This program neighborhood of available application information is pushed to the client node 10, 20 (step 102) and displayed on the client screen 12, 22 in a Program Neighborhood graphical window (step 104).

In other embodiments, the Program Neighborhood window may include applications that are in the server farm but unavailable for use to the client node 10, 20. In a Windows-based implementation, the available (and unavailable) application programs can be represented by icons. The user of the client node 10, 20 can select and launch one of the application programs displayed in the Program Neighborhood window.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. In a network including a client system and a plurality of servers hosting application programs and a host server, a method for executing an application program comprising:
    executing, by the host server, a neighborhood application to collect application-related information from the plurality of servers hosting application programs concerning the hosted application programs;
    retrieving a page template from a database;
    determining, based, at least in part, on the collected application-related information, for each hosted application program whether that hosted application program is available to a client node of the client system;
    creating, at the host server responsive to the determination and the retrieved page template, a page describing hosted application programs available to the client node of the client system, the created page comprising a graphical user interface with icons representing the available application programs, the graphical user interface further comprising icons representing active sessions and disconnected sessions;
    transmitting the created page to the client system for display;
    receiving, from the client system, a request to execute one of the available hosted application programs;
    choosing, from the plurality of servers hosting application programs, a server hosting the requested application program;
    establishing a connection between the client system and the chosen server executing the requested application using a presentation services protocol, wherein the presentation services protocol establishes a virtual channel to transmit information to the client system;
    executing the requested application program at the chosen server; and
    providing output from the executing application program directly to the client system.

2. The method of claim 1 further comprising:
    receiving another request to execute another one of the available hosted application programs;
    choosing, from the plurality of servers, a server hosting the another requested application program;
    executing the another requested application at the chosen server; and
    providing output from the another executing application program directly to the client system.

3. The method of claim 2 further comprising merging the information received from the chosen servers for transmission to the client system.

4. The method of claim 1 further comprising maintaining a database at the host server for storing the application-related information, wherein the database is accessible to each of the other servers of the plurality.

5. The method of claim 1 further comprising maintaining a database at each of the plurality of servers for storing the application-related information.

6. The method of claim 1 further comprising transmitting by each server application-related information associated with each application program hosted by that server to a centralized database.

7. The method of claim 1 further comprising transmitting by each server application-related information associated with each application program hosted by that server to each of the other servers.

8. A non-transitory computer readable medium having computer readable instructions for executing an application program that is available for use in a network including a client system and a plurality of servers hosting application programs, the computer readable medium comprising:
    instructions causing a processor to execute a neighborhood application to collect application-related information from the plurality of servers concerning application programs hosted by the plurality of servers;
    instructions causing a processor to retrieve a graphical user interface;
    instructions causing a processor to determine, based, at least in part, on the collected application-related information, for each hosted application program whether that hosted application program is available to a client node of the client system;
    instructions causing a processor to create, responsive to the determination and the retrieved page template, a page describing hosted application programs available to the client node of the client system, the created page comprising a graphical user interface with icons representing the available application programs, the graphical user interface further comprising icons representing active sessions and disconnected sessions;
    instructions causing a processor to transmit the created page to the client system for display;
    instructions causing a processor to receive a request to execute one of the available hosted application programs;
    instructions causing a processor to choose, from the plurality of servers, a server hosting the requested application program;
    instructions causing a processor to establish, in response to the request, a connection between the client system and the chosen server;

instructions causing a processor to execute the requested application program at the chosen server using a presentation services protocol wherein the presentation services protocol established a virtual channel transmit information to the client system; and instructions causing a processor to provide output from the execution of the requested application program directly to the client system.

9. The computer readable medium of claim 8, further comprising instructions causing a processor to maintain a database at one of the plurality of servers for storing the application-related information, wherein the database is accessible to each of the other servers of the plurality.

10. The non-transitory computer readable medium method of claim 8 further comprising:

instructions causing a processor to receive another request to execute another one of the available hosted application programs;

instructions causing a processor to choose from the plurality of servers, a server hosting the another requested application program;

instructions causing a processor to execute another requested application at the chosen server; and instructions causing a processor to provide output from the another executing application program directly to the client system.

11. The non-transitory computer readable medium method of claim 8 further comprising instructions causing a processor to merge the information received from the chosen servers for transmission to the client system.

12. The non-transitory computer readable medium method of claim 8 further comprising instructions causing a processor to maintain a database at each of the plurality of servers for storing the application-related information.

13. The non-transitory computer readable medium method of claim 8 further comprising instructions causing a processor to transmit by each server application-related information associated with each application program hosted by that server to a centralized database.

14. The non-transitory computer readable medium method of claim 8 further comprising instructions causing a processor to transmit by each server application-related information associated with each application program hosted by that server to each of the other servers.

* * * * *